US010665029B2

(12) United States Patent
Yeung et al.

(10) Patent No.: US 10,665,029 B2
(45) Date of Patent: May 26, 2020

(54) ENVIRONMENTAL MAPPING FOR AUGMENTED REALITY

(71) Applicant: Disney Enterprises, Inc., Burbank, CA (US)

(72) Inventors: Jason A. Yeung, Glendale, CA (US); Michael P. Goslin, Sherman Oaks, CA (US); Corey D. Drake, Sunland, CA (US); Elliott H. Baumbach, Porter Ranch, CA (US); Nicholas F. Barone, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/156,191

(22) Filed: Oct. 10, 2018

(65) Prior Publication Data

US 2020/0118337 A1    Apr. 16, 2020

(51) Int. Cl.
*G06T 19/00* (2011.01)
*G06T 17/05* (2011.01)
*G06T 7/73* (2017.01)

(52) U.S. Cl.
CPC .............. *G06T 19/006* (2013.01); *G06T 7/74* (2017.01); *G06T 17/05* (2013.01); *G06T 2207/30244* (2013.01)

(58) Field of Classification Search
None
See application file for complete search history.

(56) References Cited

U.S. PATENT DOCUMENTS

| 2014/0267234 | A1* | 9/2014 | Hook | H04W 4/02 345/419 |
| 2015/0350378 | A1* | 12/2015 | Hertel | H04L 67/42 709/203 |
| 2018/0137373 | A1* | 5/2018 | Rasmusson, Jr. | G01C 21/3638 |
| 2018/0253432 | A1* | 9/2018 | Abu-Saba | G06F 16/90332 |
| 2018/0256256 | A1* | 9/2018 | May | G06T 19/003 |
| 2018/0270436 | A1* | 9/2018 | Ivarsson | H04N 5/378 |
| 2018/0307311 | A1* | 10/2018 | Webb | G06T 3/40 |
| 2019/0146585 | A1* | 5/2019 | Khalid | G06F 3/016 |
| 2019/0164313 | A1* | 5/2019 | Ma | G06T 7/90 |

* cited by examiner

*Primary Examiner* — Ke Xiao
*Assistant Examiner* — Jed-Justin Imperial
(74) *Attorney, Agent, or Firm* — Patterson + Sheridan, LLP

(57) ABSTRACT

Embodiments provide for reconciling a first map of an environment created by a first device with a second map of the environment created by a second device by determining a first confidence score for a first location of a given object in the first map; determining a second confidence score for a second location of the given object in the second map; inserting the given object into a reconciled map at a position based on the first confidence score and the second confidence score; anchoring an Augmented Reality object in the reconciled map at coordinates based on the position of the given object; and outputting the reconciled map to an Augmented Reality device.

20 Claims, 17 Drawing Sheets

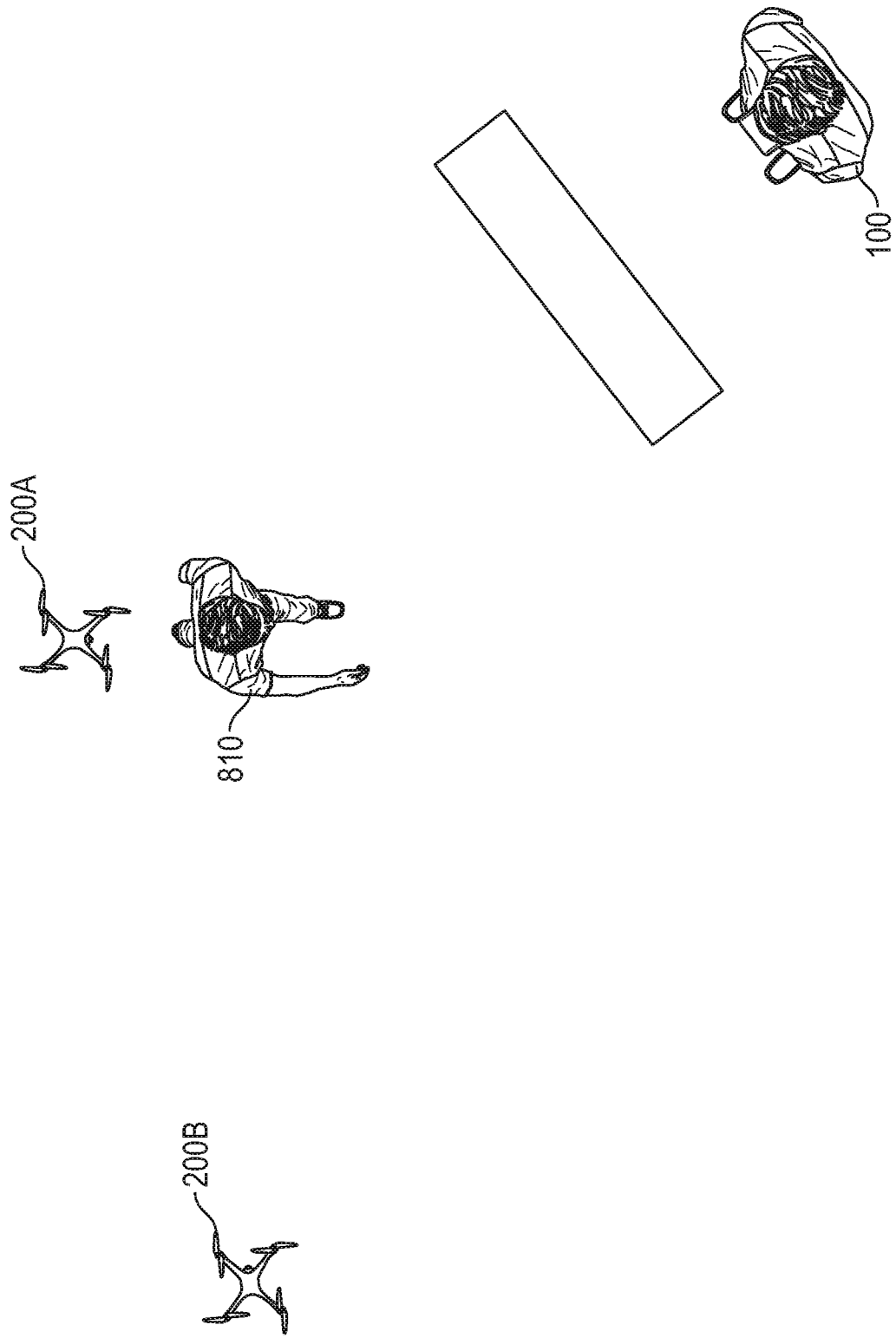

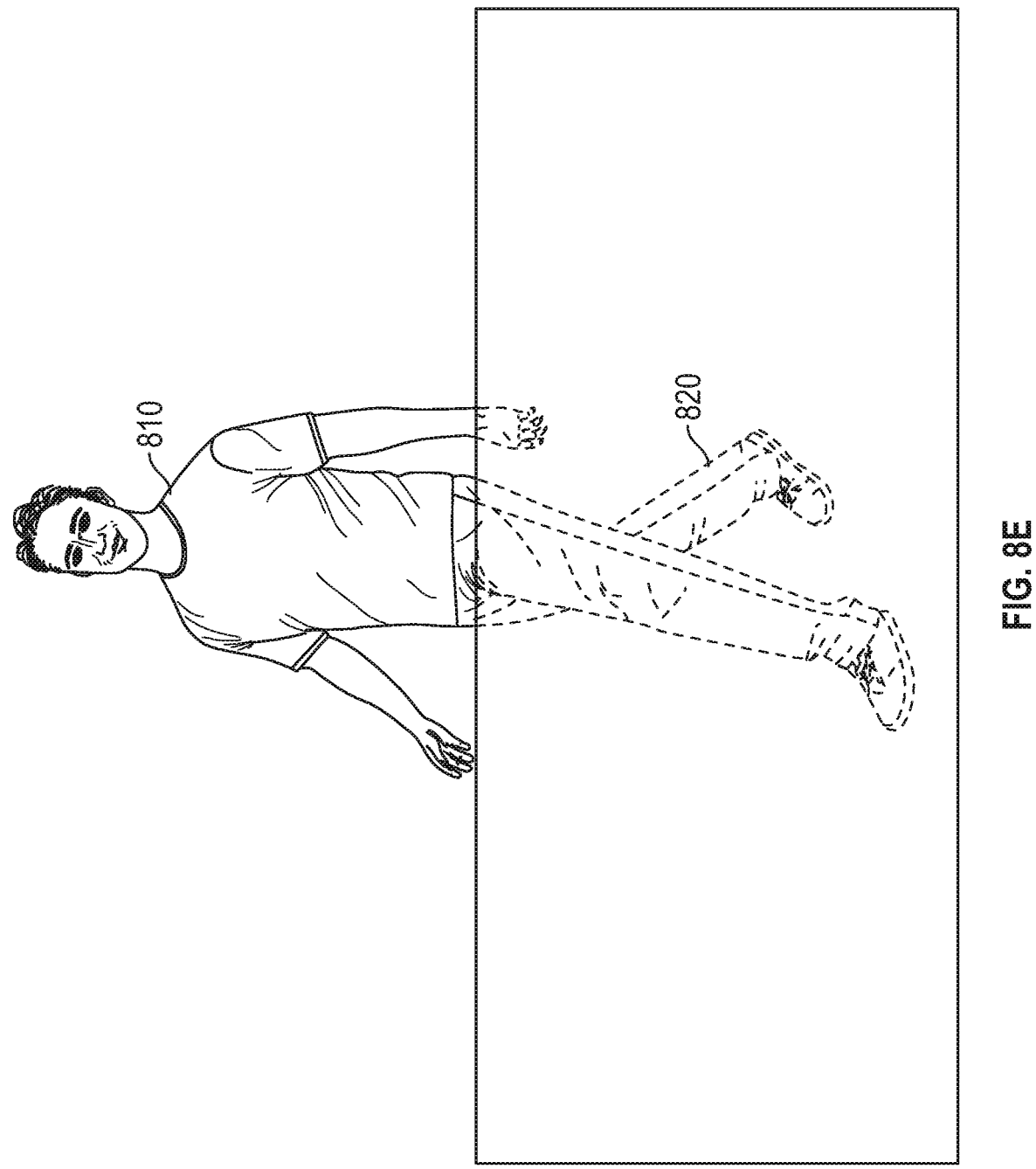

US 10,665,029 B2

ENVIRONMENTAL MAPPING FOR AUGMENTED REALITY

BACKGROUND

Augmented Reality (AR) uses a video device and a display device to display a series of images of the environment to a user that have various virtual objects inserted into appropriate places in the environment. For example, a video device may identify a real-world object of a table, so that a virtual object of a flower vase may be display on the display device as appearing on the table. In another example, a video device may identify a real-world object of a trashcan and overlay an image of a monster, so that a user of the display device is provided an amusing scene of a creature devouring rubbish when the mundane scene of a person placing rubbish into a proper receptacle is plays out. AR can be used for navigational purposes, for games, construction/architectural projects, for educational purposes, and the like.

An AR system may use an integrated video and display device or separate video devices and display devices that output the perspective of the video device, and uses the knowledge and perspective of the video device to inform the output of the display device. For example, a headset display may include an outwardly mounted camera as a video device that provides a video feed to one or more display devices positioned in front of a wearer's eyes.

SUMMARY

The present disclosure provides in one embodiment a method for environmental mapping for augmented reality by reconciling a first environmental map of an environment created by a first device with a second environmental map of the environment created by a second device, the method comprising: determining a first confidence score for a first location of a given object in the first environmental map; determining a second confidence score for a second location of the given object in the second environmental map; inserting the given object into a reconciled environmental map at a position based on the first confidence score and the second confidence score; anchoring an Augmented Reality (AR) object in the reconciled environmental map at coordinates based on the position of the given object; and outputting the reconciled environmental map to an AR device.

In another embodiment, the present disclosure provides a method for environmental mapping for augmented reality by constructing, by a first video device, a first map of the environment; identifying, by the first video device, an AR (Augmented Reality) device and a position of the AR device in the environment; retrieving a second map of the environment produced by a second video device; reconciling the first map with the second map to produce a reconciled map, wherein objects identified at a shared position in the environment in both the first map and the second map are included in the reconciled map, and objects identified at different positions in the first map and the second map are included in the reconciled map at a given position specified in one of the first map and the second map based on which of the first map and the second map is associated with a higher confidence score for the given position; anchoring an AR object at a given position in the reconciled map; orienting the video feed to the reconciled map; determining a field of view of the AR device; and overlaying the AR object at the given position of the reconciled map into a video feed output by the AR device based on the field of view of the AR device.

In a further embodiment, the present disclosure provides a method of reconciling a first environmental map of an environment created by a first video device with a second environmental map of the environment created by a second video device, the method comprising: receiving a video feed of the environment from the first video device having a given object in a field of view of the first video device; determining a first confidence score for a first location of the given object in the first environmental map; determining a second confidence score for a second location of the given object in the second environmental map; inserting the given object into a reconciled environmental map at a position based on the first location, the second location, the first confidence score, and the second confidence score; anchoring an Augmented Reality (AR) object into the reconciled environmental map based on the position of the given object; and outputting the video feed for display with the AR object overlaid onto the video feed when the position is in the field of view of the first video device.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIGS. 8A-E illustrate map reconciliation of a real-world object from environmental maps with partial of that object, according to aspects of the present disclosure

DETAILED DESCRIPTION

The present disclosure may be embodied in systems, methods, and computer readable media to provide improvements to environmental mapping in conjunction with Augmented Reality (AR) display. The functionality of AR systems using the embodiments described herein, including display devices, video devices, and combined display/video devices, is improved by providing additional information for the display of virtual objects that are not otherwise accurately resolvable by an associated video device. By reconciling two or more maps of the environment, including the positions of objects identified in those maps, an AR system may extend the output provided to the display device beyond the visible range of an associated video device, or provide a more accurate reckoning of the position of various objects within the environment in a reconciled map based on the two or more maps and the reliability factors associated with the generation of those individual maps of the environment.

Figure 1:
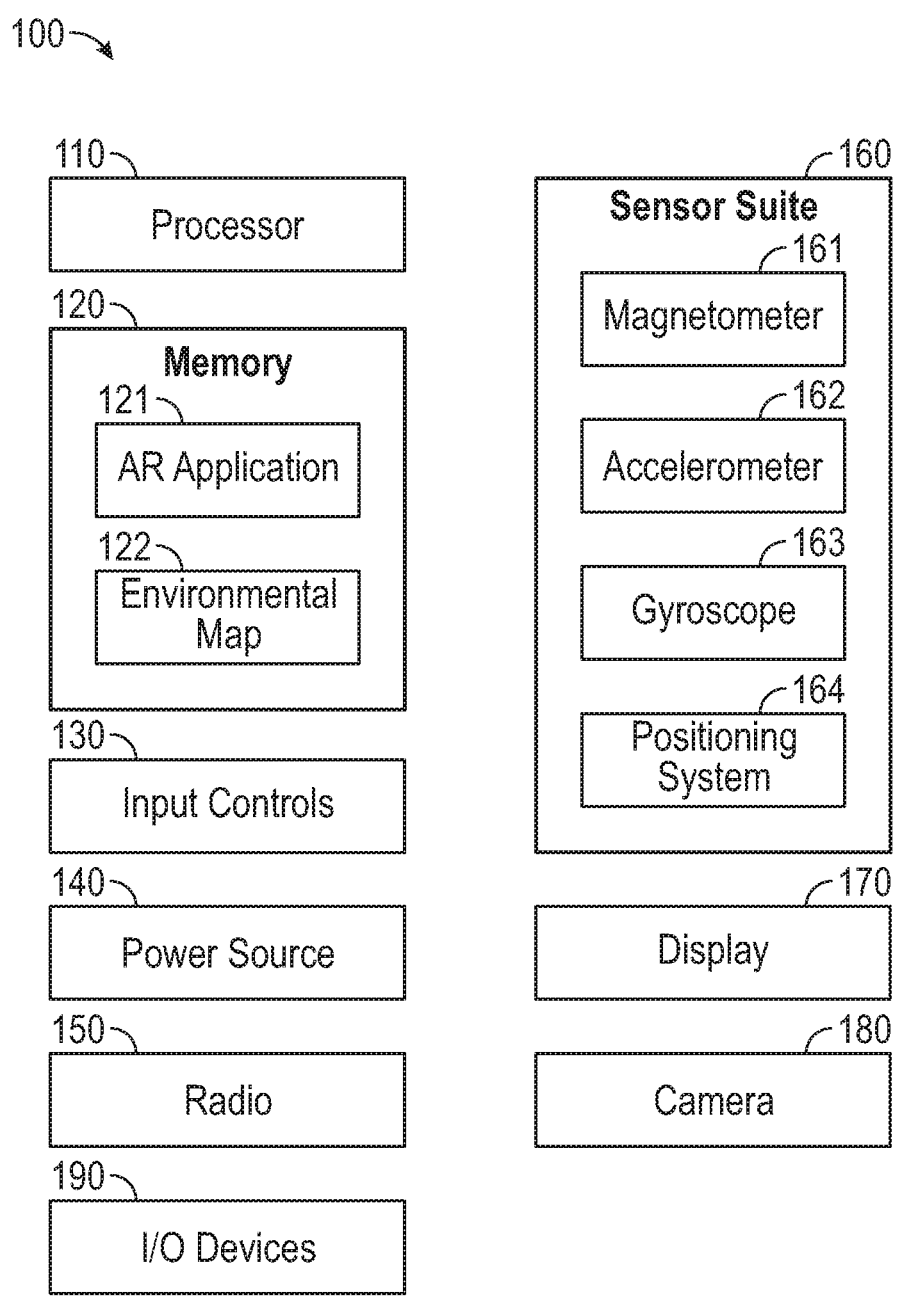
FIG. 1 illustrates an Augmented Reality device, according to aspects of the present disclosure.

FIG. 1 illustrates an AR device 100. An AR device 100 includes a processor 110, a memory 120, and various hardware to provide a user with an AR experience. In various embodiments, the AR device 100 may be an AR headset or a general computing device (e.g., a smart phone, a tablet computer, a laptop computer) that provides an AR experience.

The processor 110 and the memory 120 provide computing functionality to the AR device 100. The memory 120 may be one or more memory devices, such as, for example, Random Access Memory (RAM), Read Only Memory (ROM), flash memory, or any other type of volatile or non-volatile storage medium that includes instructions that the processor 110 may execute. The processor 110, which may be any computer processor capable of performing the functions described herein, executes commands based on inputs received from the input controls 130.

The memory 120 generally includes program code for performing various functions related providing an AR experience to a user. The program code is generally described as various functional "applications" or "modules" within the memory 120, although alternate implementations may have different functions or combinations of functions. The memory 120 also generally includes data structures that may store information for use by the various program code modules also stored thereon. The memory 120 includes program code for an AR application 121 and data structures for environmental maps 122, although other applications and data structures may also be included by the memory 120.

The AR application 121 is generally configured to provide functionality to overlay AR objects onto a video feed of the environment. In some embodiments, the code for the AR application 121 is provided to manage commands sent to and data feeds received from one or more remote devices (such as a remote video device 200 discussed in greater detail in relation to FIG. 2) as well as various sensors included in a sensor suite 160 of the AR device 100.

In various embodiments, the AR application 121 is provided one or more environmental maps 122 to aid in providing the AR experience to a user. The AR application 121 may generate or update the environmental map 122 at startup of the AR device 100 or in response to a command. Environmental maps 122 include positional data for various real-world and virtual objects for use in the AR experience by the AR application 121. The objects may include positional data indicated via relative coordinates (e.g., X meters from another object, in the living room, X meters from the AR device 100) or by absolute coordinates (e.g., at latitude X and longitude Y), including positions of various components of the object (e.g., facial expressions, poses/limb positions, open/closed statuses), and orientations of the object in the environment (e.g., facing X direction). Various objects may be classified and identified in the environmental map 122 (e.g., a tree, a road, a wall, a person, etc.) via image recognition or signals transmitted by that object (e.g., a second AR device 100 that broadcasts an identity beacon). In various embodiments, the environmental map 122 is a three dimensional mesh image of the environment (and objects therein), a two dimensional representation of the environment, a three dimensional projection of the environment or objects therein (such as an architectural preview rendering).

The AR device 100 includes one or more input controls 130 to receive input from a user to thereby control the AR experience. The input controls 130 may include physical joysticks, physical steering wheels/yokes, physical buttons, physical switches, microphones, and a touch interface that designates various regions for use as virtual joysticks, buttons, switches, etc. A user may manipulate the various input controls 130 to signal the AR application 121 to alter the AR experience, select from various environmental maps 122, shut down the AR device 100, switch to a different application, change system settings (e.g., volume, brightness), etc.

The power source 140 provides electric power to the various components of the AR device 100. Various examples of power sources 140 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 140.

The radio 150 provides wireless communications for the AR device 100. In various embodiments, the radio 150 is a transmitter/receiver, which receives signals from external sources (e.g., remote video device 200, as described in greater detail in relation to FIG. 2) and transmits signals to external devices. The radio 150 may be in communication with various antennas and may configure messages to be transmitted or received according to various standards, such as, Bluetooth, Wi-Fi, or a proprietary standard.

The sensor suite 160 includes a magnetometer 161, an accelerometer 162, a gyroscope 163, and a positioning system 164, among other sensors. The sensor suite 160 may include additional sensors, several instances of each sensor, or may omit some of the example sensors discussed herein. The magnetometer 161 is a sensor that provides a bearing to a north pole of a magnetic field in the environment in which the AR device 100 is present. The magnetometer 161 may thus provide the AR device 100 with a directional sense in terms of yaw orientation with respect to magnetic north. The accelerometer 162, which measures acceleration forces acting on the AR device 100, may provide the AR device 100 with information of whether the AR device 100 (or a portion thereof) is moving, and in which direction(s). The gyroscope 163 measures orientation of the AR device 100 (or a portion thereof), and may provide the AR device 100 with information of whether the AR device 100 (or portion thereof) is level or to what degree the AR device 100 is tilted in one or more planes. The combination of the accelerometer 162 and gyroscope 163 may thus provide the AR device 100 with a direction sense in terms of pitch and roll with respect to gravity. The positioning system 164 may provide absolute positioning information (e.g., via a Global Positioning System (GPS) receiver) and relative positioning information (e.g., via a range finder, a camera sensor including image recognition software to identify objects and distances thereto based on known sizes).

In some embodiments, the AR application 121 uses the sensor suite 160 to build an environmental map 122, to determine where the AR device 100 is located on an existing environmental map 122, and to identify when to display AR objects to the user on a display 170 of the AR device 100 based on a location and orientation of the AR device 100.

The display 170 includes one or more devices used to output AR objects or a video feed to a user. In one example, the display 170 includes a projector and a transparent/translucent surface onto which AR images are projected by the projector and through with a user may view the environment into which the AR objects are inserted. In another example, a Liquid Crystal Display (LCD), Light Emitting Diode (LED), or other display technology is used to present a video feed into which AR objects have been programmatically inserted or overlaid for output to the user. In a further example, two displays 170 are provided, one for each eye of a user, such that the user is provided three-dimensional AR objects in the field of view.

A camera 180 is optionally included or activated in the AR device 100 to provide a video feed over which AR objects may be overlaid or into which AR objects may be programmatically inserted. The camera 180 may be omitted or deactivated in embodiments that use an external device to provide a video feed or a transparent surface that a user may view the environment through. In various embodiments, the camera 180 is provided in conjunction with image recognition software (stored on the memory 120) to identify various real-world objects in the field of view, which once identified may be used by the AR application 121 for inclusion in an environmental map 122 or as an anchor point for an AR object output to the user on the display 170.

Additional Input/Output (I/O) devices 190 may be included in various embodiments of an AR device 100. The additional I/O devices 190 may include various lights, displays, and speakers (e.g. LEDs, IR transmitter/receivers, speaker, buttons, microphones, light sensors, etc.) for providing output from the AR device 100 in addition to that provided by the display 170 or radio 150. For example, a speaker is an I/O device 190 that provides audio output (e.g., of an audio component of a video feed or an AR sound effect).

Figure 2:
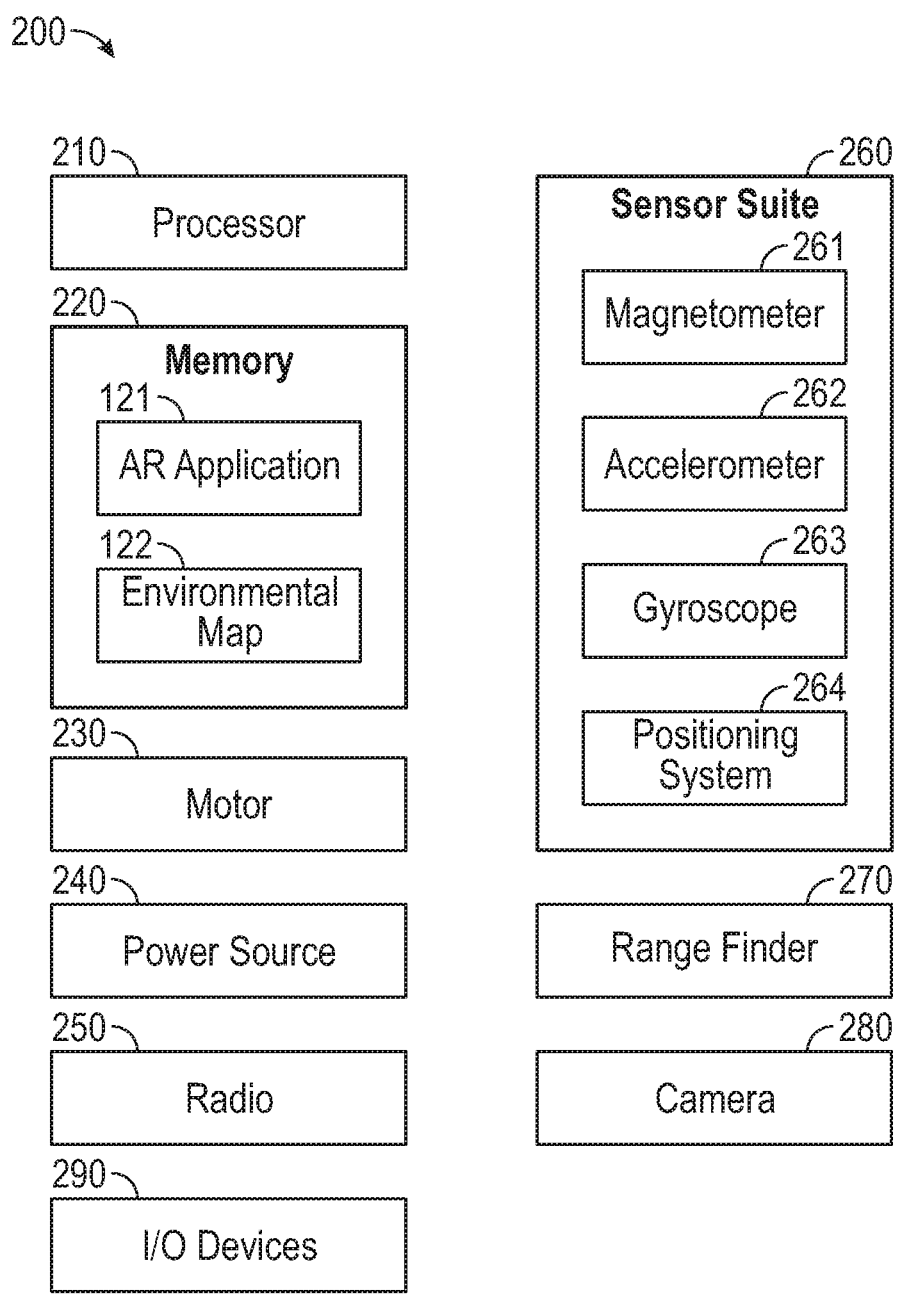
FIG. 2 illustrates a remote video device. according to aspects of the present disclosure.

FIG. 2 illustrates a remote video device 200. A remote video device 200 includes a processor 210, a memory 220, a camera 280, and various hardware to provide video or map data to a display device for provision of an AR experience on the display device. A remote video device 200 is "remote" in that a separate display device is used by a user to view video data or map data provided by the remote video device 200, such as, for example, the AR device 100 discussed in greater detail in regard to FIG. 1. In various embodiments, the remote video device 200 may be a device controlled by the user, autonomously controlled, or controlled by a second user that shares data with the display device of a first user. For example, a first user may control a "drone" as a remote video device 200, which provides a video feed from the perspective of the drone to the user via output on an AR device 100. In another example, a security camera may transmit data on request to an AR device 100 to provide an improved AR experience from what is otherwise capable for the AR device 100. In a further example, map data or video data may be shared between two or more users in a shared environment to expand the environmental mapping or AR opportunities that an individual device of the participating devices would otherwise be capable of.

The processor 210 and the memory 220 provide computing functionality to the remote video device 200. The memory 220 may be one or more memory devices, such as, for example, Random Access Memory (RAM), Read Only Memory (ROM), flash memory, or any other type of volatile or non-volatile storage medium that includes instructions that the processor 210 may execute. The processor 210, which may be any computer processor capable of performing the functions described herein, executes commands based on inputs received from autonomous guidance software or manual controls from a remote user device.

The memory 220 generally includes program code for performing various functions related providing an AR experience to a user. The program code is generally described as various functional "applications" or "modules" within the memory 220, although alternate implementations may have different functions or combinations of functions. The memory 220 also generally includes data structures that may store information for use by the various program code modules also stored thereon. The memory 220 includes program code for an AR application 121 and data structures for environmental maps 122, although other applications and data structures may also be included by the memory 220.

In some embodiments, the remote video device 200 includes one or more motors 230 for locomotion or actuation. In various embodiments, the motors 230 are electrical motors that are selectively provided power from the power source 240 based on instructions executed by the processor 210. The motors 230 may provide locomotive force or actuation of various portions of the remote video device 200 (e.g., rotation of a camera 280). In an example, a motor 230 connected with a drive wheel in the base of the remote video device 200 may induce the remote video device 200 to move forward, in reverse, or turn left or right. In another example, a motor 230 connected as a pinion with a rack that is connected with one or more wheels may induce remote video device 200 to steer when locomotion is supplied by another remote video device 200. In a further example, a motor 230 is provided to a propeller to enable the remote video device 200 to fly and navigate in the air.

The power source 240 provides electric power to the various components of the remote video device 200. Various examples of power sources 240 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 240.

The radio 250 provides wireless communications for the remote video device 200. In various embodiments, the radio 250 is a transmitter/receiver, which receives signals from external sources (e.g., AR device 100, as described in greater detail in relation to FIG. 1) and transmits signals to external devices. The radio 250 may be in communication with various antennas and may configure messages to be transmitted or received according to various standards, such as, Bluetooth, Wi-Fi, or a proprietary standard.

The sensor suite 260 includes a magnetometer 261, an accelerometer 262, a gyroscope 263, and a positioning system 264, among other sensors. The sensor suite 260 may include additional sensors, several instances of each sensor, or may omit some of the example sensors discussed herein. The magnetometer 261 is a sensor that provides a bearing to a north pole of a magnetic field in the environment in which the remote video device 200 is present. The magnetometer 261 may thus provide the remote video device 200 with a directional sense in terms of yaw orientation with respect to magnetic north. The accelerometer 262, which measures acceleration forces acting on the remote video device 200, may provide the remote video device 200 with information of whether the remote video device 200 (or a portion thereof) is moving, and in which direction(s). The gyroscope 263 measures orientation of the remote video device 200 (or a portion thereof), and may provide the remote video device 200 with information of whether the remote video device 200 (or portion thereof) is level or to what degree the remote video device 200 is tilted in one or more planes. The combination of the accelerometer 262 and gyroscope 263 may thus provide the remote video device 200 with a direction sense in terms of pitch and roll with respect to gravity. The positioning system 264 may provide absolute positioning information (e.g., via a GPS receiver) and relative positioning information (e.g., via a range finder 270, a camera sensor including image recognition software to identify objects and distances thereto based on known sizes). The sensor suite 260 may further include one or more depth sensors. This may include one or more transmitters and detectors of infrared and/or near-infrared light. For example, a depth sensor may include a monochrome image sensor and an infrared projector for creating 3D imagery of a surrounding area by measuring the "time of flight" of infrared signals as they reflect off of nearby objects.

In some embodiments, the AR application 221 uses the sensor suite 260 to build an environmental map 222, to determine where the remote video device 200 is located on an existing environmental map 222, and to perform automatic navigation or collision avoidance.

A range finder 270 is included in the remote video device 200 to provide distance measurements from the known (or estimated) location of the remote video device 200 to various objects identified in the environment. In various embodiments, the range finder 270 uses reflected light or sound (e.g., a laser or sonar distance detector) to determine a distance to an object from a position of the remote video device 200. In additional or other embodiments, the range finder 270 uses the known size of objects and image recognition software to extrapolate a distance between the remote video device 200 and the object in the environment based on an apparent size of the object to the remote video device and a ratio of the apparent size to the known size of the object. In one embodiment, the range finder 270 may include a depth sensor of sensor suite 260. For example, the range finder 270 may comprise a laser for measuring the distance of objects that are far away (e.g. objects that are small in a camera view) and may also include an infrared emitter and detector of sensor suite 260 to measure objects in its immediate vicinity.

A camera 280 is included in the remote video device 200 to provide a video feed over which AR objects may be overlaid or into which AR objects may be programmatically inserted. In various embodiments, the camera 280 is provided in conjunction with image recognition software (stored on the memory 220) to identify various real-world objects in the field of view, which once identified may be used by the AR application 221 for inclusion in an environmental map 222 or as an anchor point for an AR object output to the user on the display 170.

Additional Input/Output (I/O) devices 290 may be included in various embodiments of the remote video device 200. The additional I/O devices 290 may include various lights, displays, and speakers (e.g. LEDs, IR transmitter/receivers, speaker, buttons, microphones, light sensors, etc.) for providing output from the remote video device 200 in addition to that provided by the radio 250. For example, a speaker is an I/O device 290 that provides audio output (e.g., of an audio component of a video feed or an AR sound effect).

Figure 3A:
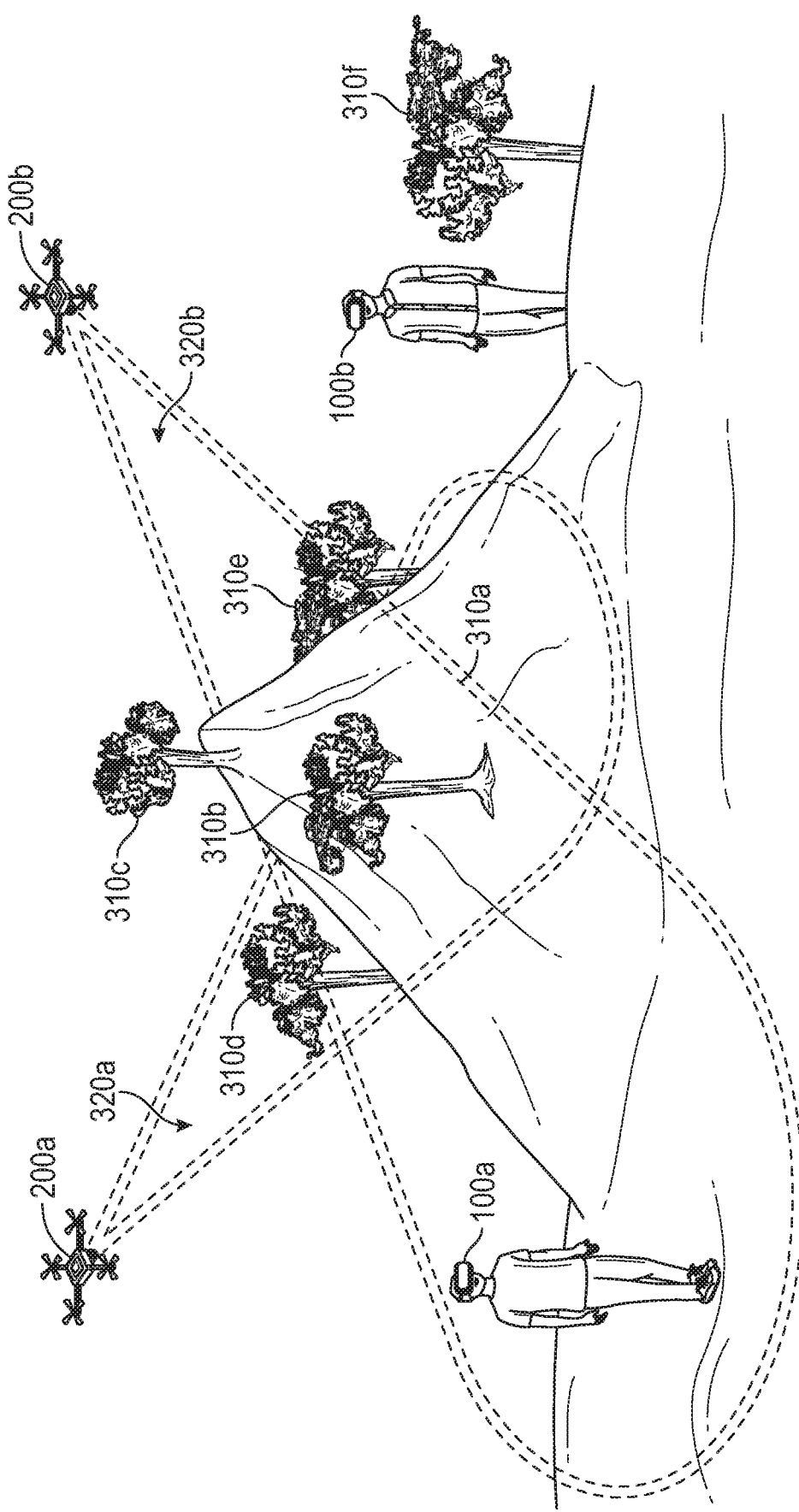
FIGS. 3A-C illustrate a use case for environmental mapping for Augmented Reality, according to aspects of the present disclosure.
Figure 3B:
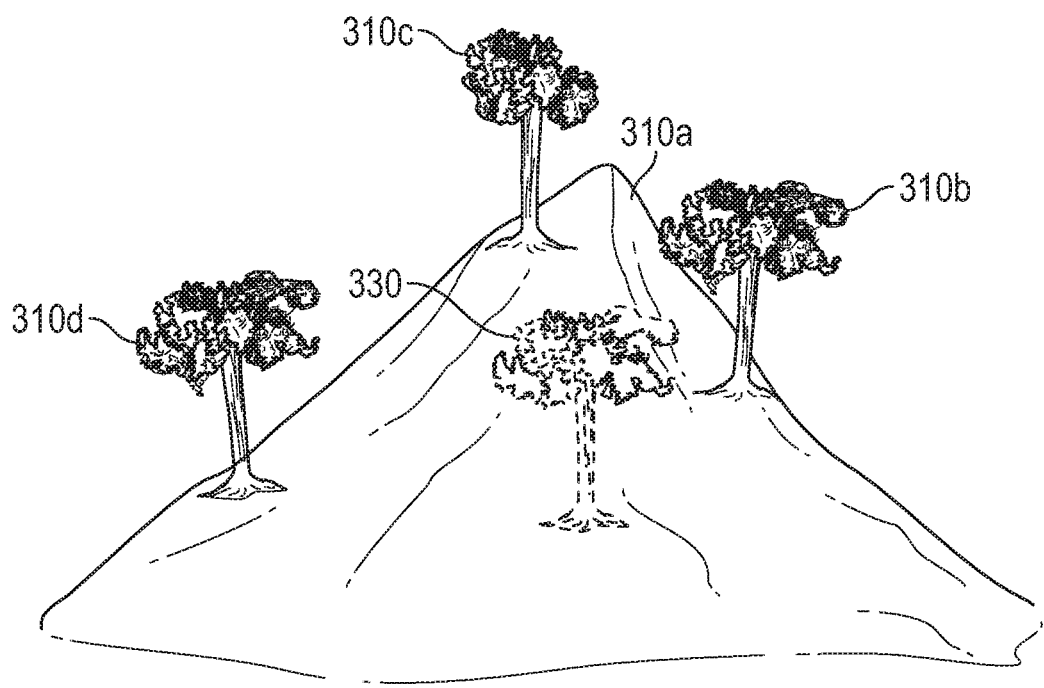
Figure 3C:
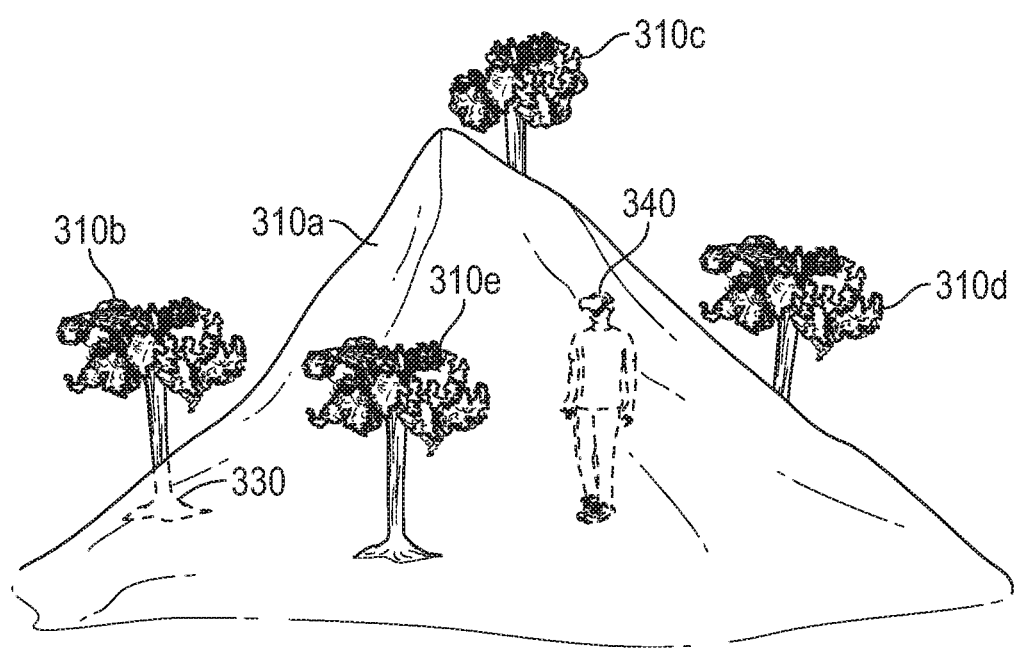

FIGS. 3A-C illustrate a use case for environmental mapping for Augmented Reality. FIG. 3A illustrates a scene in which a first user and a second user, of first AR device 100a and of second AR device 100b respectively, are blocked from each other's line of sight by a first real-world object 310a, (generally, real-world object 310), which is illustrated herein as a hill that blocks the users from directly viewing one another. A first remote video device 200a and a second remote video device 200b, illustrated herein as drones, provide additional information on the environment to at least one of the AR devices 100 based on objects within the field of view (FOV 320) of the respective video device 200. The additional information provided by the remote video devices 200 may be presented in a variety of ways, including as AR objects 330 that have been visually identified and anchored in a reconciled environmental map 122, as AR objects 340 that have been non-visually identified and anchored in a reconciled environmental map 122, as textual AR enhancements, etc. For example, the first and second users may be participating in a game session using AR to provide "X-ray vision" or another visual effect with AR objects 340 representing real-world objects 310 that are positioned in the environment outside of a particular user's normal line of sight but in the line of sight of another device and displayed to the user consistent with the real-world location of that object relative to the user's line of sight.

FIG. 3B illustrates the AR FOV 350 that the first AR device 100a provides to the first user in FIG. 3A in conjunction with the data from the first FOV 320a of the first video device 200a. Facets of the first real-world object 310a, the second real-world object 310b, the third-real-world object 310c, and the fourth real-world object 310d are visible to the first user, and are shown in the AR FOV 350. The fifth real-world object 310e, which is not directly visible to the first user or the first AR device 100a, is shown as an AR object 330, because the fifth real-world object 310e is within the FOV 320a of the first remote video device 200a, which is sharing environmental data with the first AR device 100a.

FIG. 3C illustrates the AR FOV 360 that the second AR device 100b provides to the second user in FIG. 3A in conjunction with the data from the first FOV 320a of the first video device 200a and the second FOV 320b of the second video device 200b. An AR device 100 may receive additional environmental data gathered from one or more devices that are collected in a reconciled environmental map 122. Facets of the first real-world object 310a, the second real-world object 310b, the third-real-world object 310c, the fourth real-world object 310d, and the fifth real-world object 310e are visible to the second user, and are shown in the AR FOV 360. The second real-world object 310b, which is partially visible to the second user or the second AR device 100b, and is visible to the first remote video device 200a is shown with an AR object 330 aligned with the second real-world object 310b to complete an image of that object for display to the user. The first user, who is not directly visible to the second user or second AR device 100b, but is visible to the second remote video device 200b is represented in the AR FOV 360 as an AR object 340.

As will be appreciated, the example use case in FIGS. 3A-C may also be applied to situations where a real-world object 310 is too far away from a particular remote video device 200 or AR device 100 for an AR device 100 to resolve details of the real-world object 200 on its own, and uses data from a different remote video device 200 that is able to resolve details of that real-world object 310. For example, if the first user and the second user were not obstructed from one another by the real-world object 310a of the hill, but separated by too great of a distance for image recognition or skeleton tracking/pose recognition software to make out the identity or pose of the other user, the remote video devices 200 may provide an AR object 340 using data available to one or more of the remote video devices 200 to supplement the AR experience provided to the users. As an example, there may be an instance whether the user can visibly make out the position and movement of another user's body (including arms, legs, head, etc.); however, there is insufficient image data pertaining to the other user for pose recognition software to identify a skeleton. This may be the case for a neural network or other prediction network that may require a certain amount in order to recognize a pose from raw pixel data or other raw image data. Thus the AR device 100 may need to obtain another source of information about the subject in order to generate a properly posed avatar or other AR object 340 that can be overlaid over or inserted with the other user to maintain realism and continuity in an AR experience or gameplay. In various embodiments, the remote video devices 200 map positional and pose information for persons in the environment to skeletons for provision to the AR devices 100 as avatars of those persons when the person is fully or partially from a user (e.g., by distance or a physical obstruction). For example, the AR object 340 of FIG. 3C may be provided to the second user as an avatar of the first user that is posed and identified in accordance with the pose and identity for the first user supplied by one or more of the remote video devices 200.

An AR object 330 associated with a real-world object 310 may be presented as a stylized version of that object (e.g., a stock or cartoon image of a tree may represent a real-world object 310 of a tree as AR object 330), as a ghosted or color-shifted image from the remote video device 200 displayed on the AR device 100 (e.g., the image of a real-world tree captured from another viewpoint may be projected with a more reddish hue as the AR object 310 corresponding to the tree), or as a related object presented in association with the real-world object 310 (e.g., a AR object 330 of a cartoon astronaut next to a real-world object 310 of a rocket). An AR object 340 presented as an avatar of a person may mimic the actions of the person as viewed by the video devices 200 (e.g., waving when the user waves), and may mimic the pose of the person represented by that AR object 340.

In various embodiments, AR objects 330/340 are representations of real-world objects 310 that are anchored to a position in the environmental map coinciding with the location of the corresponding real-world object 310 or other AR objects 330. In other embodiments, AR objects 330/340 are virtual objects that are anchored to a position in the environmental map based on the location of one or more real-world objects 310. For example, an AR object 330/340 for a real-world object 310 of tree may be positioned in an environmental map 122 with the same coordinates as the tree has. In another example, an AR object 330 of a cartoon lumberjack may be positioned in an environmental map 122 with coordinates a predefined distance from a real-world object 310 of a tree. Continuing the prior example, a second AR object 340 of a cartoon blue ox may be positioned in the environmental map 122 with coordinates a predefined distance from the first AR object 330 of the cartoon lumberjack. AR objects 330 may be positioned so as to obscure or to avoid obscuring real-world objects 310 or other AR objects 330 in various scenarios.

In various embodiments, AR objects 330/340 are selectively displayed when the positions of the AR objects 330/340 are within the FOV of an AR device 100 and visible to the user. In some embodiments, an AR object 33/340 is displayed when a corresponding real-world object 310 within the FOV of the AR device 100, but is obscured by another real-world object 310 (e.g., a hill, wall, pillar) and is not displayed when the real-world object 310 is visible. For example, an AR object 330 of a tree is shown when the real-world object 310 of the tree is obscured by another real-world object 310 of a hill. In other embodiments, an AR object 330/340 is displayed when a position in the environment is within the FOV of an AR device 100 and not obscured by a real-world object 310, and is not displayed when a real-world object 310 obscures the position of the AR object 330. For example, when a user can see an area where cartoon character is anchored as an AR object 300, the AR device 100 will display the AR object 330 of the cartoon character to the user.

In additional embodiments, a distance from a viewer to the AR object 310 determines whether the AR object 330 is displayed at a scaled size or is displayed at all. For example, an AR device 100 for a user who is more than a predefined distance from the AR object 330 may not display the AR object 330 to the user. In a further example, an AR device 100 may scale the size of an AR object 330 based on a distance of the user to the AR object 330 so as to display the AR object 330 as larger when the user is closer and smaller when the user is further away.

The AR FOV 350 in FIG. 3B and the AR FOV 360 in FIG. 3C may include a video feed produced by a camera 180 onto which AR objects 330/340 are overlaid, or may use a display 170 that is semi-transparent through which real-word objects 310 are visible and onto which AR objects 330/340 are displayed.

When providing AR objects 330 anchored to real-world objects 310 as part of an AR experience using several perspectives, different devices may produce environmental maps 122 in which the various real-world objects 310 are determined to be located at different locations. When positioning (including posing) the various AR objects 330 based on these different positional data, differences between the locations and positions of the real-world objects 310 may result in misplaced or inconsistently placed AR objects 300. To improve the accuracy and consistency of the AR experience when using several perspectives, the various environmental maps 122 are reconciled into one environmental map 122 based on a confidence score of the determined positional data for the real-world objects 310, and the AR objects 330 are anchored into the reconciled map for consistent and accurate display.

The confidence scores for the locations of the objects may be based on several different reliability factors, used alone or in combination, for how the positional data of the real-world object 310 is determined. For example, a confidence score may give greater weight to locations determined via range finders 270 rather than image recognition/size comparisons made by a camera 280 and image processing software. In various embodiments, reliability factors considered in a confidence score include at least one of: an instrument used to determine the location (higher accuracy/more precision specification correlated to greater confidence), a distance to the location from the measuring device (closer distance correlated to greater confidence), how long ago the determination was made (more recent determinations correlated to greater confidence), a speed at which the device travels when making the determination (lower speed correlated to greater confidence), a weather condition at the time of determination (more ambient light, less rain/humidity, and lower wind speeds each correlated to greater confidence), a recognized type of the real-world object (static objects correlated to greater confidence than mobile objects), a number of devices agreeing on a location (more devices in agreement correlated to greater confidence), and the like. The location used for a real-world object 310 in the reconciled environmental map 122 may select the location with the highest confidence score, an average of the locations weighted by the confidence scores, or a specific device to use as the basis for the location.

Figure 4A:
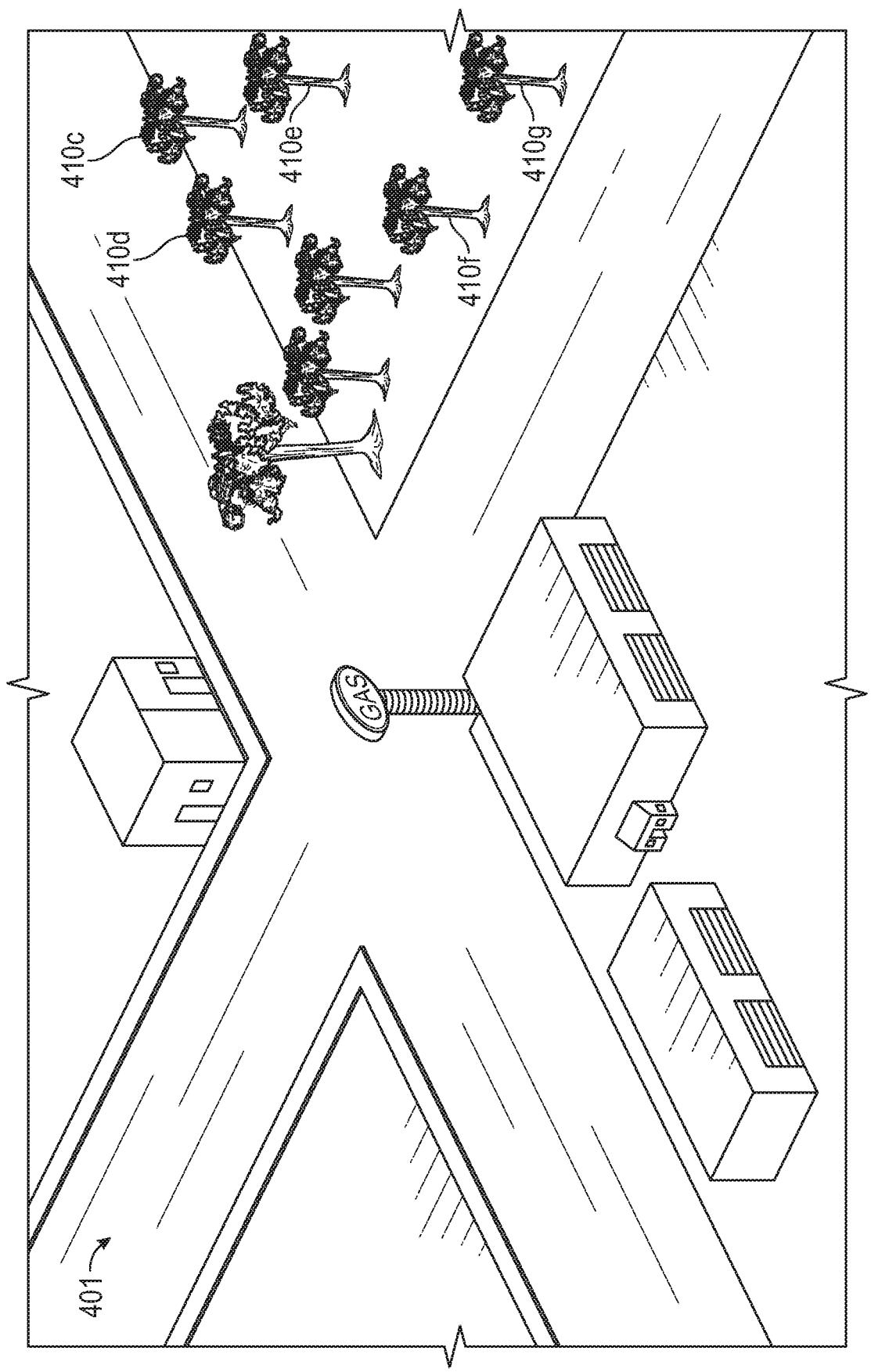
FIGS. 4A-C illustrate scenes of a mapped environment using Augmented Reality, according to aspects of the present disclosure.
Figure 4B:
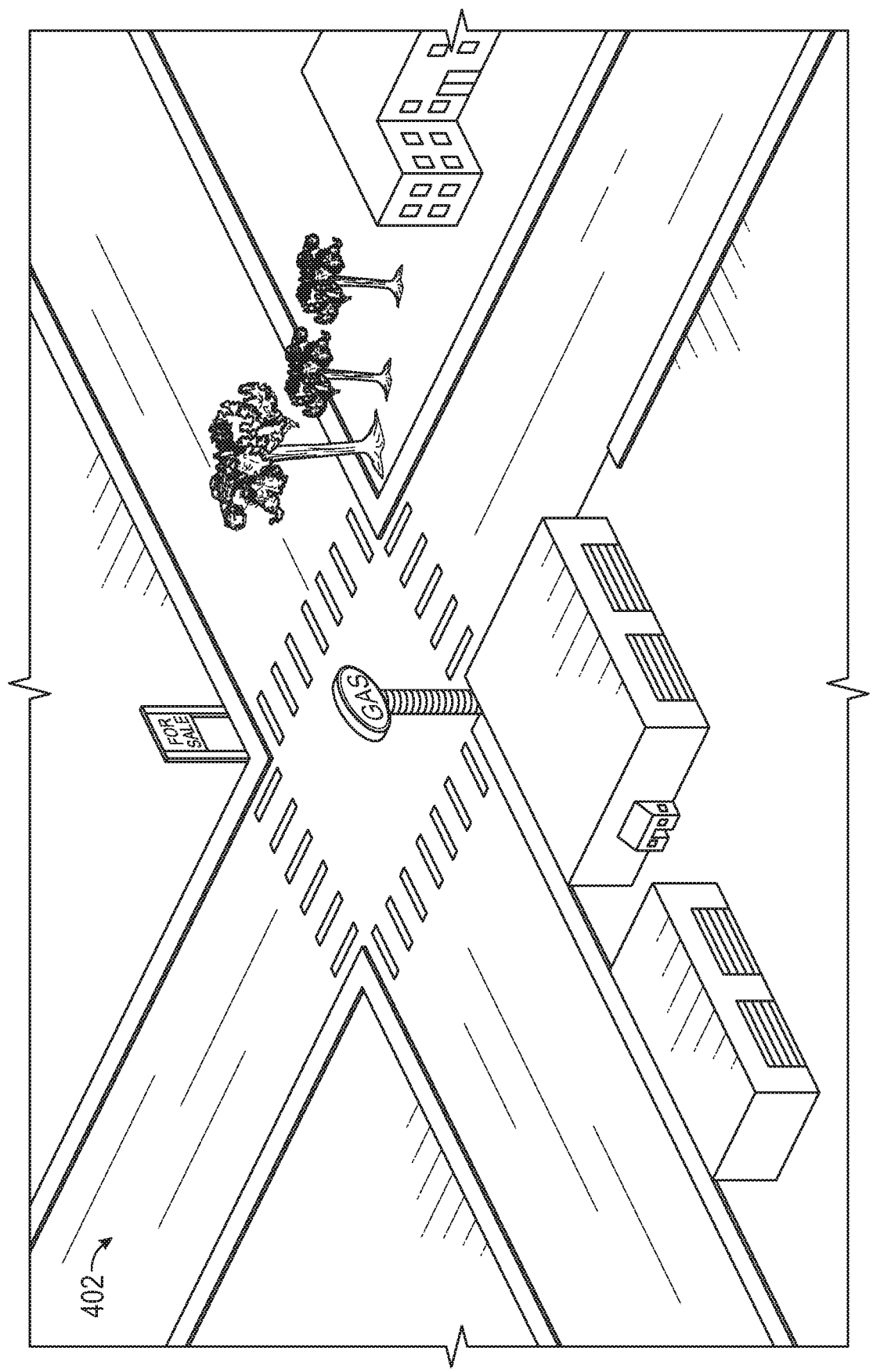
Figure 4C:
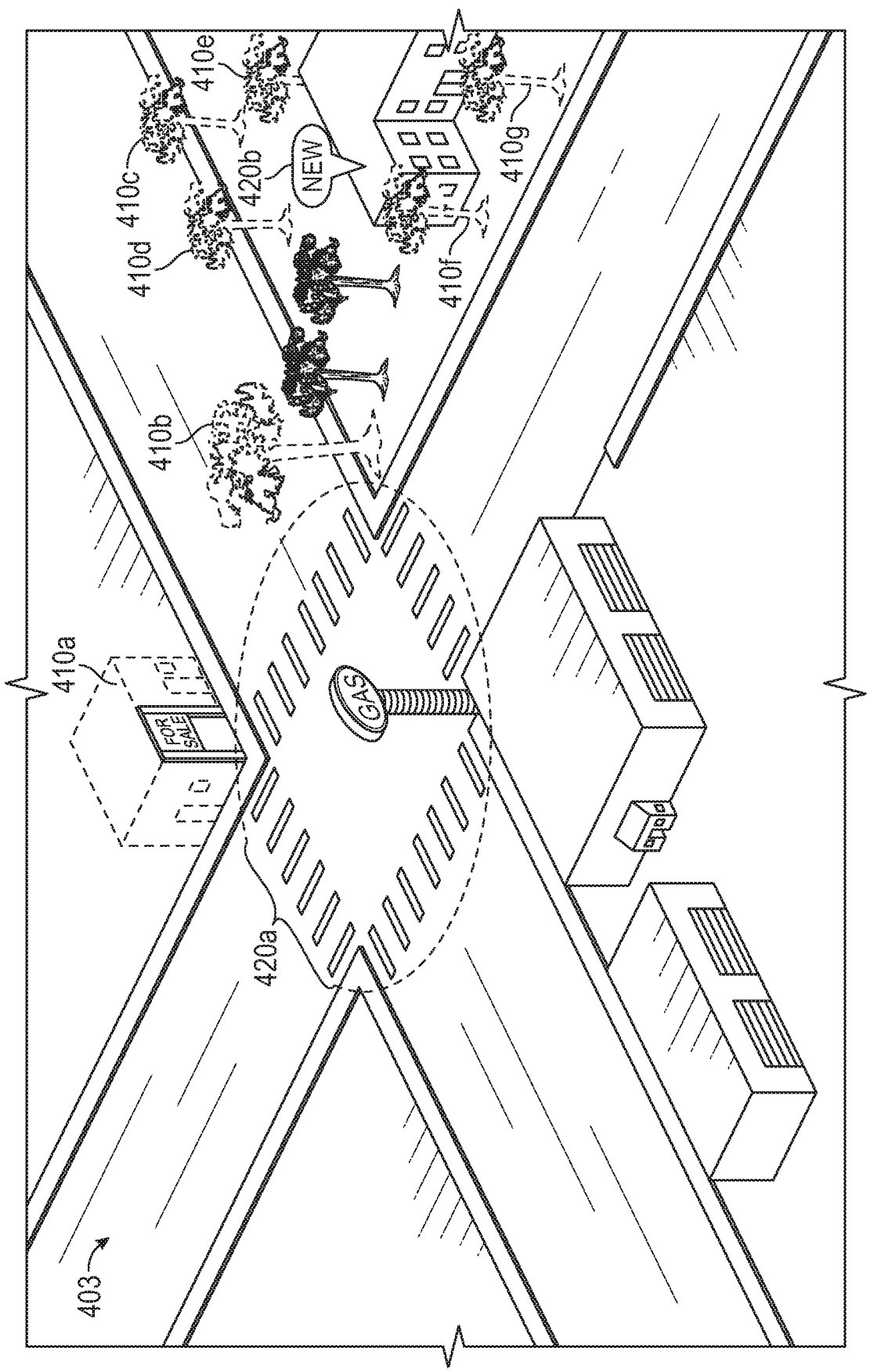

FIGS. 4A-C illustrate scenes of a mapped environment using Augmented Reality. FIG. 4A illustrates a first view 401 of the scene at a first time. FIG. 4B illustrates a second view 402 of the scene shown in FIG. 4A at a second, later, time. FIG. 4C illustrates an AR view 403 of the scene shown in FIG. 4B overlaid with AR objects. FIG. 4C provides several AR objects 410 to highlight real-world objects that have been removed from the scene between the first and the second times, and several AR objects 420 to highlight real-world objects that have been added to the scene between the first and the second times.

For example, a real-world object of a building that was razed between the first time and the second time may be displayed as a first AR object 410a in an AR experience to show a user where that building used to be in relation to the current environment. Other AR objects 410b-g may show the user other real-world objects that are present in the first map but are not identified in the second map. These other AR objects 410b-g may be presented when an associated real-world object is no longer present, or when another real-world object has obscured or blocked display of that real-world object. For example, a newly constructed building may block a user's current view of a tree, which may or may not still be present in the environment, and may therefore be displayed to the user as an AR object 410.

In another example, a real-world object of crosswalks that have been added to a street between the first time and the second time may be highlighted with an AR object 420a of a marker or an AR object 420b of a text box. The AR application may use AR objects 420 to highlight new objects in the environment to draw the user's attention to difference in the environment.

In various embodiments, either the first view 401 or the second view 402 may be actual views of the scene or may be computer generated images of the past (for first view 401) or the future (for second view 402). For example, the second view 402 may be an architectural plan that shows expected changes to the environment that the AR application 121 overlays over the present-day view of first view 401 for presentation to a viewer in the AR view 403. In another example, the second view 402 is a view of the present day, and the AR application overlays AR objects 410a-b and 420a-g to provide a user with an AR experience to show the user how the environment looked in the past.

Figure 5:
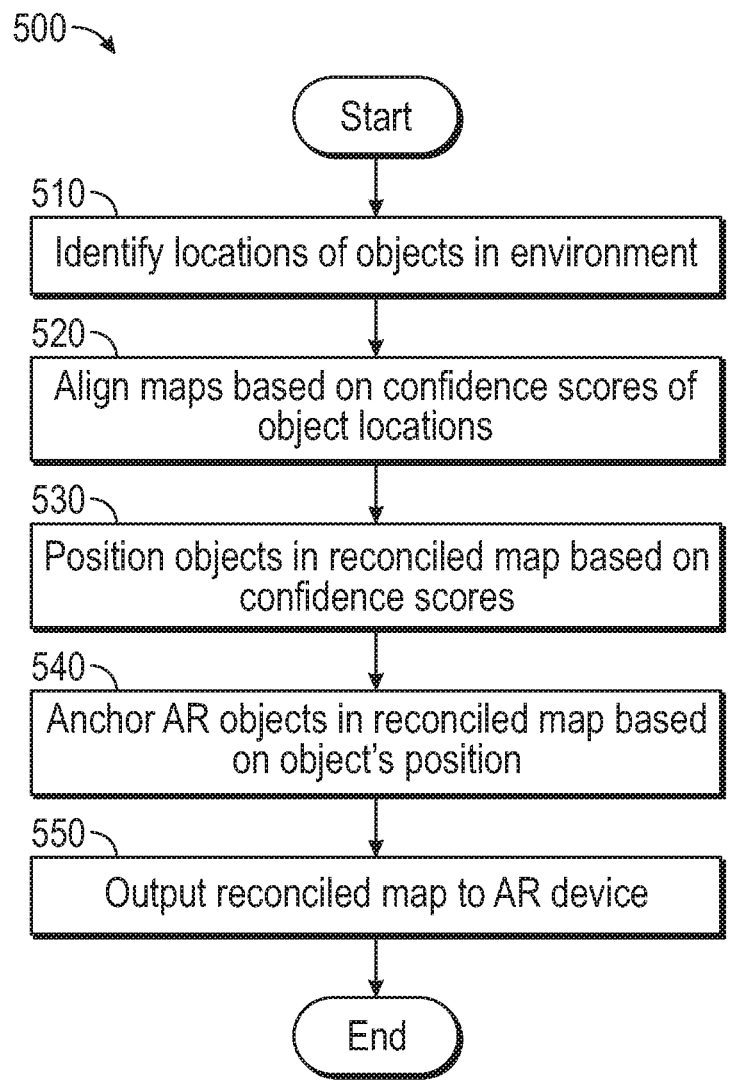
FIG. 5 is a flowchart of a method to map an environment for use with Augmented Reality, according to aspects of the present disclosure.

FIG. 5 is a flowchart of a method 500 for reconciling environmental maps 122. A reconciled environmental map 122 uses data from two or more maps of an environment to produce an improved map that includes more objects, more precisely located objects, or different objects than the constituent maps. A reconciled map may be used in providing an AR experience, in which AR objects are anchored to positions in the reconciled map for display to a user of an AR device 100.

Method 500 begins with block 510, where the AR application 121 identifies objects in the constituent maps being reconciled as being the same object or different objects. For example, when reconciling a first map a second map, the AR application 121 identifies each of the objects in both of those maps to determine whether a given object in the maps are different instances of one object or two different objects. Objects may be identified and compared to one another in different maps by one or more of a location of the object in the environment, a distance of the object to a second object in the environment, a shape or appearance of the object, and a known identifier of the object. Different maps may identify the same object in different ways. For example, the AR application 121 may use a GPS location from a device noted in a first map and a relative location of an object noted in a second map (e.g., X feet away from a measuring device) to identify the object. The AR application 121.

The location data for the objects identified in the constituent maps may come from a variety of sources, with various levels of precision and accuracy. For example, a first remote video device 200a at a known location (via GPS coordinates) may produce a first map in which various objects and the locations thereof are determined via a range finder 270 via distances and headings from the known location. A camera 280 of a second remote video device 200b may produce a second map in which various objects and the locations thereof are extrapolated based on an apparent size of the object based to the second remote video device 200b and a known size of the object or other nearby objects visible to the second video device 200b. The AR application 121 handles differences in precision/accuracy in the constituent maps, allowing for a fuzzy locational matching between objects in the constituent maps. For example, if the first map identifies an object at location X and the second map identifies an object of the same class at location Y, the AR application 121 may treat those objects as the same object if location X is within Z meters of location Y, where Z may be a predefined threshold or an overlapping tolerance threshold of the precisions offered by the two maps.

Additionally, the AR application 121 may use time or a static/mobile classification to determine whether an object in one map is the same object in another map. For example, the AR application 121 may identify an object that is classified as mobile (such as a car, boat, person, animal, etc.) at location X at time A in a first map and identify that object at location Y at time B in a second map, and identify the two maps as including two instances of one object at two location; the given object has moved from location X to location Y from time A to time B. In another example, the AR application 121 may identify an object that is classified as mobile at location X at time A in a first map and identify a different object at location X at time B in a second map; a second mobile object has taken the place of the first mobile object at location X from time A to time B.

At block 520, the AR application 121 aligns the constituent maps based on the confidence scores of the object location(s) for objects identified in the maps. In one example, of two or more objects identified as the same object that remain at the same location in the constituent maps are used as alignment points that define the same locations in the real-world in two or more maps being aligned. In another example, one or more objects, such as roads or buildings, located at a series of coordinates covering at least a predefined amount of space are used to determine portions of the two or more maps that define the same locations and may be used as alignment points that define the same locations in the real-world in two or more maps being aligned. In various embodiments, one or more of the maps being aligned include areas that have been mapped (and objects locate therein) that are not included in the other maps.

At block 530, the AR application 121 positions/poses the objects in a reconciled map based on confidence scores and locations for those objects in the constituent maps. As each object in each map may be associated with different conditions for which the location of that object was set in the original map, the AR application 121 uses the confidence scores of each set location to determine where to position/pose the given object in the reconciled map. In some embodiments, the AR application 121 selects the location with the highest confidence score to use as the position of the object in the reconciled map. In other embodiments, the AR application 121 uses a combined location for an object that is weighted by the confidence scores. Consider, for example, a first map with a first object located at the coordinates of (X,Y,Z) and a second map with the first object located at the coordinates of (A,B,C). In some examples, if the confidence score for the location of the first object is higher in the first map than the second map, AR application 121 sets the location of the first object in the reconciled map to the coordinates of (X,Y,Z). In other examples, the AR application 121 combines each coordinate in a weighted average based on the confidence scores to set the location of the object to, for example, ($\{[c_1X+c_2A] \div [c_1+c_2]\}$, $\{[c_1Y+c_2B] \div [c_1+c_2]\}$, $\{[c_1Z+c_2C] \div [c_1+c_2]\}$), where $c_1$ is the confidence score for the location in the first map and $c_2$ is the confidence score for the location in the second map.

A block 540, the AR application 121 anchors AR objects in the reconciled map based on the positions of objects in the reconciled map. The AR application 121 may insert AR objects as a two-dimensional objects, viewed the same from every angle, or as three-dimensional object that provide different appearances when viewed from different angles. The AR application may insert the AR objects at the positions of one or more real-world objects to obscure or overlay the display of the real-world object in an AR experience, or may insert the AR objects at positions offset from real-world objects to be displayed in conjunction with the real-world objects in an AR experience. The AR objects may be stored as pointers in the reconciled map that point to various image, video, and text files for display to the user when appropriate trigger conditions have been met.

At block 550, AR application 121 outputs the reconciled map to the AR device 100 for provision of an AR experience. The reconciled map may be stored on one or more AR devices 100 or remote video device 200 for later user in providing an AR experience, and may be updated as more environmental data are collected, additional objects are identified, or as the user interacts with the AR experience. Method 500 may then conclude.

Figure 6:
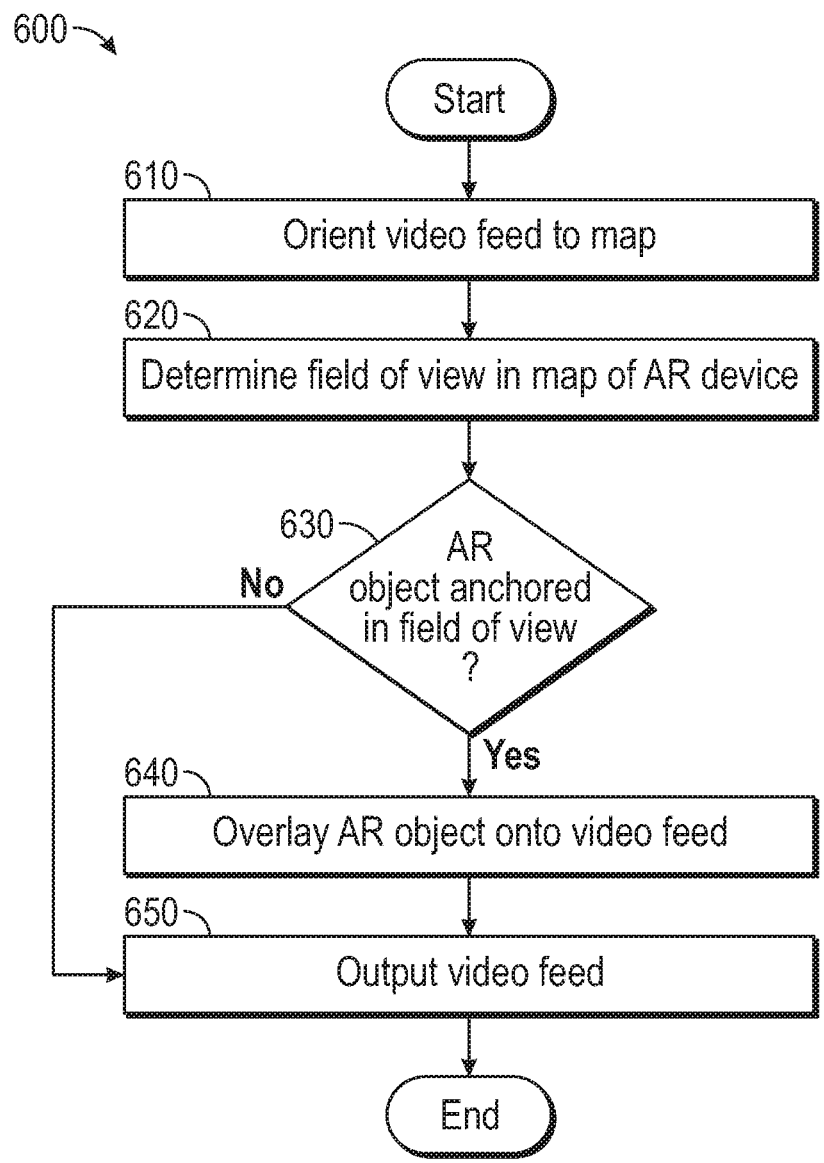
FIG. 6 is a flowchart of a method for providing an Augmented Reality experience via a reconciled environmental map, according to aspects of the present disclosure.

FIG. 6 is a flowchart of a method 600 for providing an AR experience via a reconciled environmental map. Method 600 begins at block 610, where the AR application 121 orients a video feed for the AR experience to the environmental map 122 in which the AR objects have been anchored. The AR application 121 determines where the AR device 100 or the remote video device 200 that provides the video feed is located in the environment (e.g., via a positioning system 164/264) and a heading of the camera 180/280 (e.g., provided by a magnetometer 161/261) in the environment.

At block 620, the AR application 121 determines the FOV of the AR device 100 in the map. The AR application 121 may use the lens angle the camera 180/280 to determine how wide the FOV extends from the camera 180/280, and a predefined draw distance or focal distance of a camera 180/280 to determine how far the FOV extends from the camera 180/280. The FOV specifies a set of coordinates in the map at which a user is deemed to have within a visible area for an AR experience.

In various embodiments of determining the FOV, the AR application 121 determines which objects (real-world or AR) positioned in the map will block or obscure other objects from FOV of the video feed output to the user. For example, an object of a wall between the device providing the video feed and a second object may be determined to block the view of (at least some of) the second object. In another example, the AR application 121 may specify that an AR object is to be overlaid over a real-world object or "in front of" a real-world object and therefore may block the FOV behind that AR object. In a further example, the AR application 121 may specify that an AR object corresponding to a first real-world object is to be within the FOV because a second real-world object otherwise blocks the viewer from seeing the first real-world object (e.g., as an "X-ray vision" effect).

At block 630, the AR application 121 determines whether an AR object in the map is anchored within the FOV. If the coordinate space covered by the FOV includes an AR object, method 600 proceeds to block 640, where the AR application overlays the AR object onto the video feed of the AR experience at the specified location. Depending on the position of various objects in the FOV, the AR application 121 may overlay several AR objects into the FOV. Each AR object is overlaid at the coordinates at which the AR object is anchored in the map so that the user is presented with a consistent view of the environment with AR objects inserted therein. In some embodiments, an AR object may be re-anchored to different coordinates in the environment so that the user is presented with a mobile AR object.

At block 650, the AR application 121 outputs the video feed for display on the display 170 of the AR device 100. The video feed may include one or more AR objects overlaid onto the video feed per block 640, or may be free of overlaid AR objects if the AR application 121 determines that no AR objects are anchored in the field of view per block 630. Method 600 may then conclude.

Figure 7A:
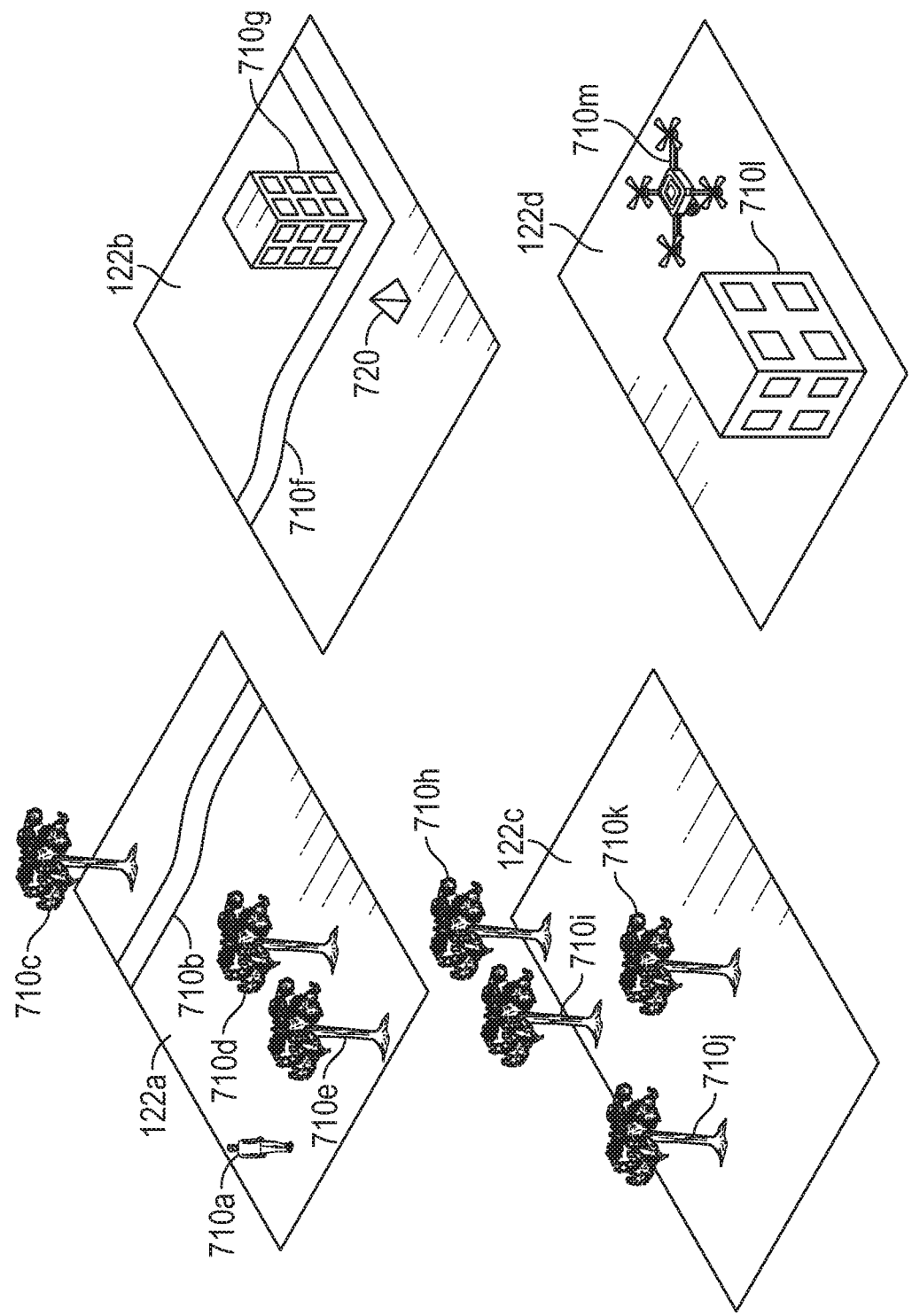
FIGS. 7A-C illustrate map reconciliation and provision of an Augmented Reality experience thereon, according to aspects of the present disclosure.
Figure 7B:
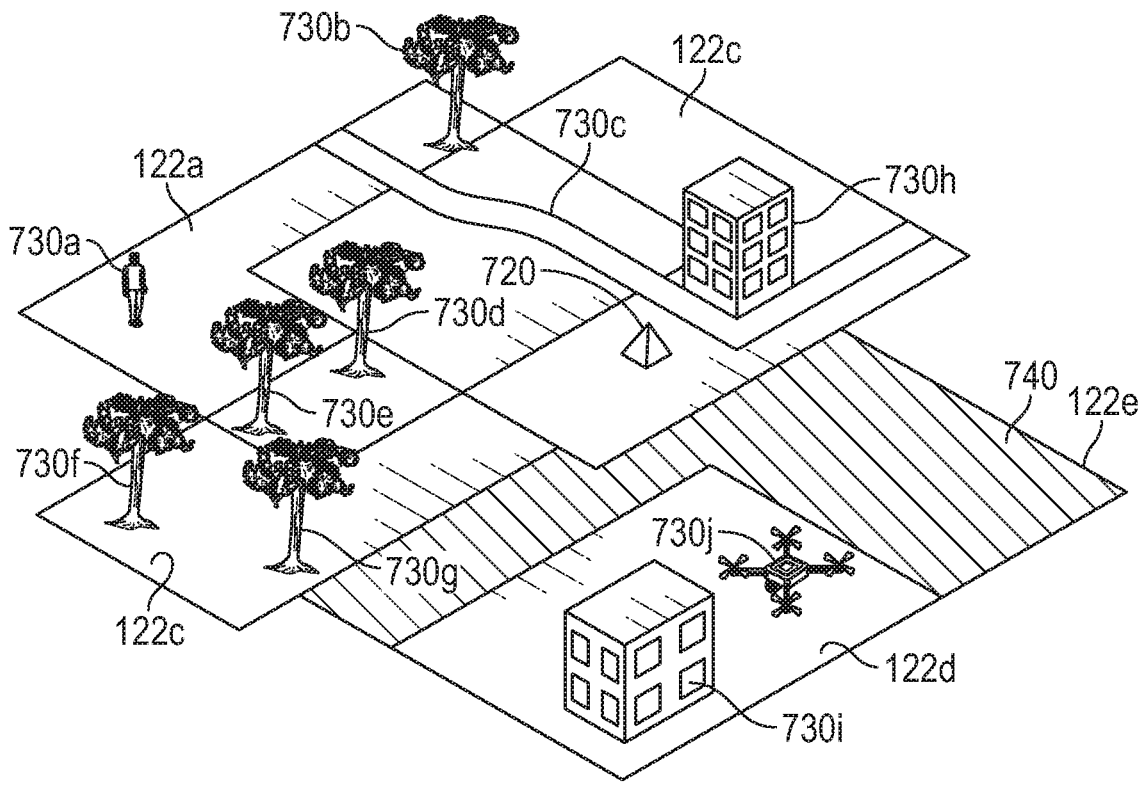
Figure 7C:
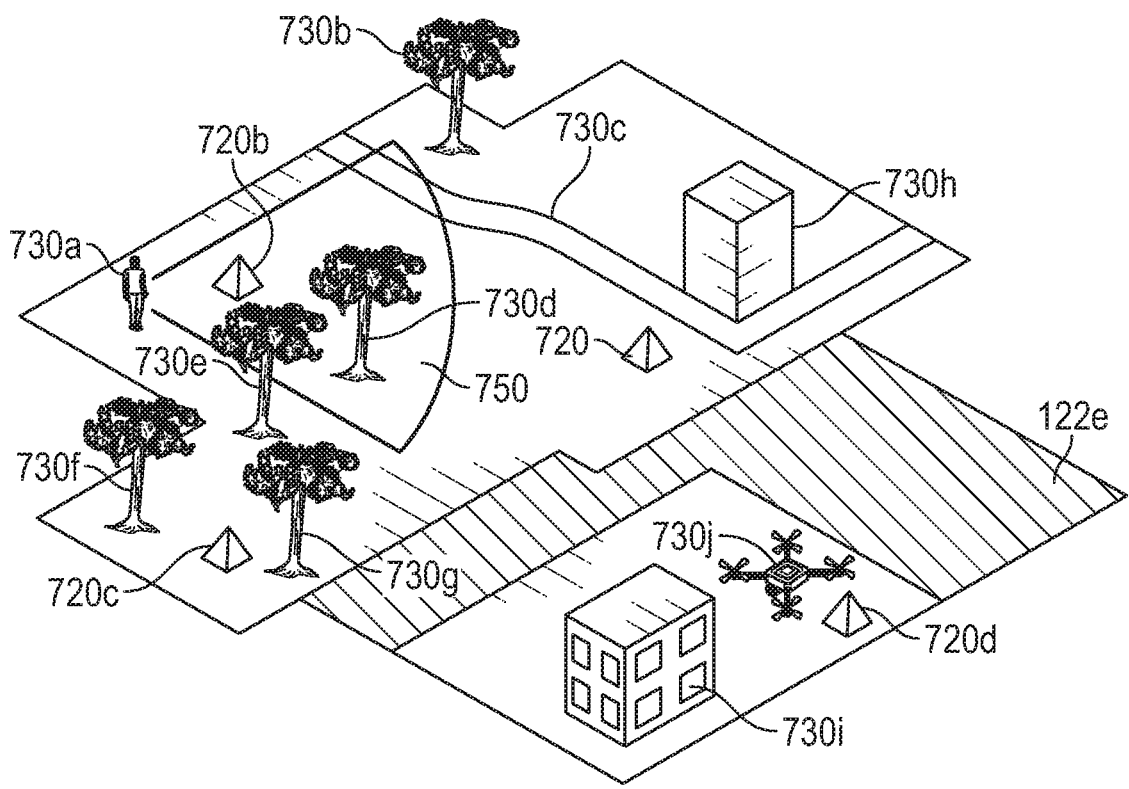

FIGS. 7A-C illustrate map reconciliation and provision of an Augmented Reality experience thereon. FIG. 7A illustrates four environmental maps 122a-d. The first environmental map 122a includes the locations of a user (a first real-world object 710a), a pathway (a second real-world object 710b), and three trees (real-world objects 710c-e). The second environmental map 122b includes the locations of a pathway (a seventh real-world object 710f), a building (a seventh real-world object 710g), and an anchored AR object 720. The third environmental map 122c includes the locations for four trees (real-world object 710h-k). The fourth environmental map 122d includes the locations for a building (twelfth real-word object 710l) and a drone (thirteenth real-world object 710m).

FIG. 7B illustrates a reconciled environmental map 122e that uses the four environmental maps 122a illustrated in FIG. 7A as constituent maps. The AR application 121 aligns and merges the constituent maps to create a reconciled environmental map 122e. The various real-world objects 710a-m illustrated in the individual constituent environmental maps 122a-d are compared to one another to determine how the constituent maps relate to one another. As illustrated, the reconciled environmental map 122e includes reconciled real-world objects 730a-j, an anchored AR object 720, and interstitial space 740.

The individual real-world objects 710 from the several constituent maps are examined to determine and identify various reconciled real-world objects 730, which may combined one or more real-world object 710 from corresponding constituent maps into a single reconciled real-world object 730. The position of the reconciled real-world object 730 in the reconciled environmental map 122 is based on the locations specified in the constituent maps and the relative confidences therein. In FIGS. 7A and 7B, the second and the fourth real-word objects 710b/d are determined to be one reconciled real-world object 730c; the fourth and eighth real-word objects 710d/h are determined to be one reconciled real-world object 730d; and the fifth and the ninth real-world objects 710e/i are determined to be one reconciled real-world object 730e.

In one example, some of the real-world objects 710 in multiple environmental maps 122 that are determined to represent one reconciled object 730 are used as alignment points to join the constituent maps of a reconciled environmental map 122e. In one example, because the fourth reconciled real-world object 730d and the fifth reconciled real-world object 730e have known locations in both the first environmental map 122a and the third environmental map 122c, the first and third environmental maps 122a/c may be aligned and joined at those known locations. In another example, because a portion of the second real-world object 710b and the seventh real-world object 710f are known to occupy a shared space in the environment from the first and second environmental maps 122a/b, that shared space is used to align and join the first and second environmental maps 122a/b.

In a further example, known locations and headings of real-world objects 710 in different constituent environmental maps 122 are used to align and join those constituent environmental maps 122. For example, the location and heading of the user (first real-world object 710a) in the first environmental map 122a and the location and heading of the drone (thirteenth real-world object 710m) in the fourth environmental map 122d may be used to determine how the first and fourth environmental maps 122a/d are related to one another in the larger environment. Any portion of the larger environment that is not included in the constituent maps may be included in the reconciled environmental map 122 as interstitial space 740. The interstitial space 740 represents portions of the greater environment between constituent maps that is not described in a constituent map, is known to be out-of-date or inaccurate, is purposely hidden from a user (e.g., as part of a game), or otherwise remains terra incognita for purposes of providing an AR experience.

FIG. 7C illustrates the provision of an AR experience using the reconciled environmental map 122e as illustrated and discussed in relation to FIG. 7B. The reconciled environmental map 122e of FIG. 7C includes the environmental data and reconciled real-world objects 730 identified in FIG. 7B, anchored AR objects 720a-d, and a determination of a FOV 750 for an AR device 100 associated with the user. The AR application 121 may retain any AR objects 720 anchored in the constituent environmental maps 122, may remove/replace any AR objects 720 anchored in the constituent environmental maps 122, and may insert new AR objects 720 into the reconciled environmental map 122. The AR objects 720 may be within the FOV 750 or outside of the FOV 750 (e.g., blocked by another object, out of range). The AR application 121 overlays the AR objects 720 that are within the FOV 750 into a video feed for presentation to the user. The AR application 121 tracks how the FOV 750 is oriented within the environment as described in the environmental map 122 to determine when to overlay an AR object 720 and where to overlay that AR object 720 in the video feed for presentation of the AR object 720 as though the AR object 720 exists in the environment as a real-world object 730.

FIGS. 8A-E illustrate map reconciliation between environmental maps 122 captured by several remote video devices 200 in which a real-world object 810 is partially viewed by the several remote video devices 200, but resolved from multiple views to determine the orientation/pose/expression of the real-world object 810 for use in an AR experience.

Figure 8A:
Figure 8A:
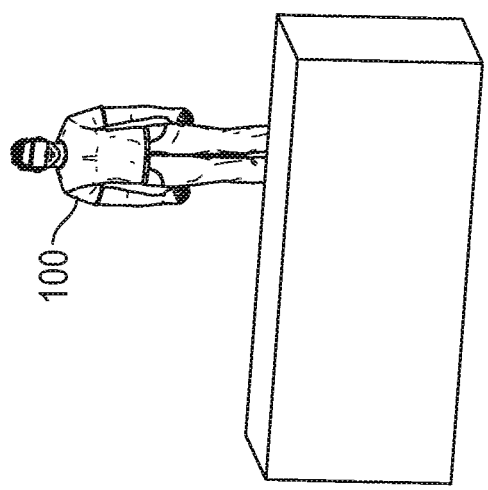
Figure 8A:
Figure 8A:
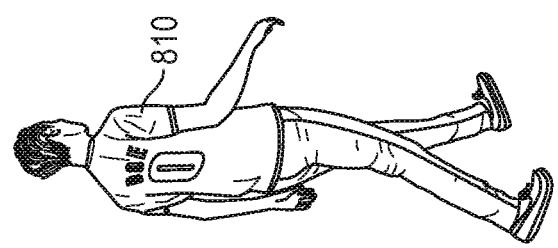
Figure 8A:
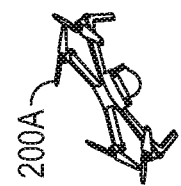

FIG. 8A illustrates a scene in which a real-world object 810 of a person is seen from three angles and distances by three remote video devices 200 of drones. The resolved scene may be provided to a user of an AR device 100, a video gaming device, television, or the like to provide additional information related to the real-world object 810 to an AR application 120 in the form of an AR object corresponding to the real-world object 810, which may be out for display or used for internal purposes without being output for display.

Figure 8B:

FIG. 8B illustrates the scene from the viewpoint of the first remote video device 200a. Due to the proximity of the first remote video device 200a to the real-world object 810, the first remote video device 200a produces a video feed of the environment that includes a portion of the real-world object 810. The partial image of the real-world object 810 may limit the environmental map 122 that the first remote video device 220a is able to produce at a given time. For example, the upper torso of the person represented as real-world object 810 consumes most of the FOV for the first remote video device 200a, and a first environmental map 122a produced by the first remote video device 200a may include a mesh of the upper torso, a relative location in the environment (e.g., based on the location of the first remote video device 220a and a distance and angle to the real-world object 810), and other information available to the first remote video device 200a (e.g., an identify from a jersey number, a color worn, wearable device identifier). However, the first environmental map 122a may lack information about the rest of the person such as the pose (e.g., limb positions), facial expression, etc.

Figure 8C:
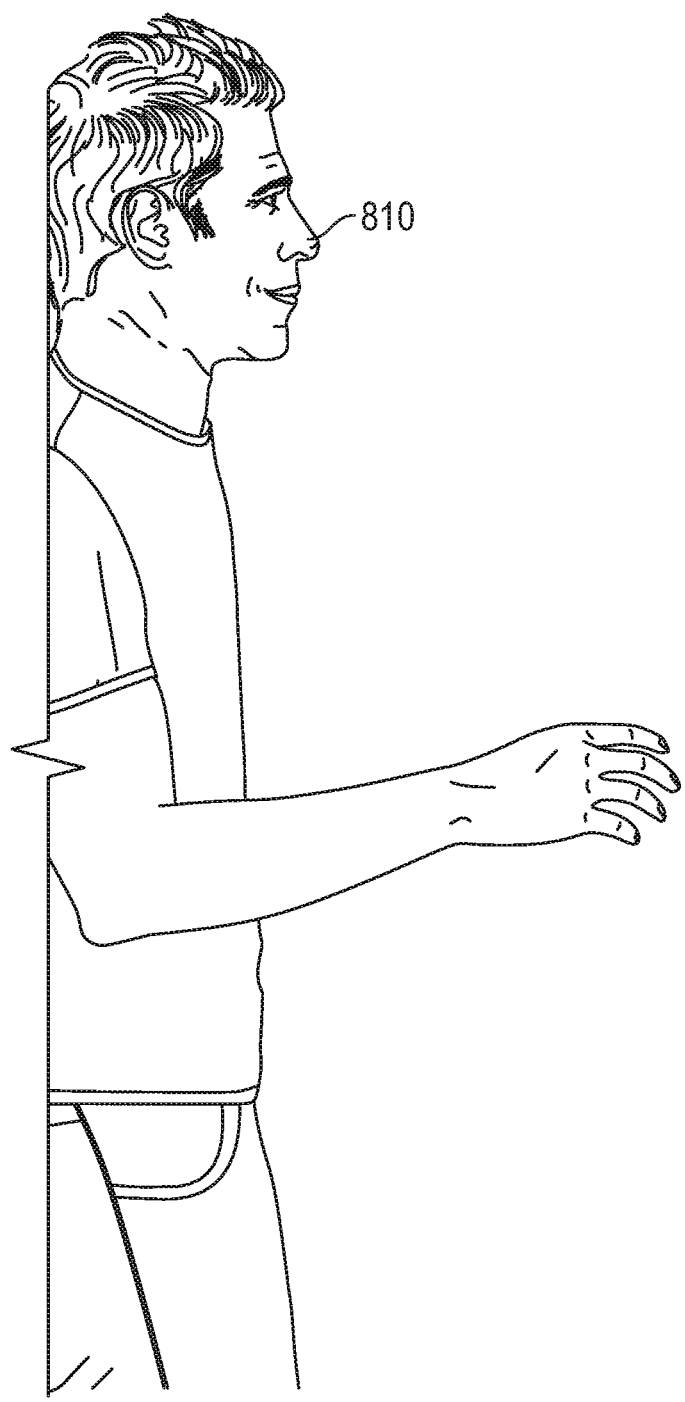

FIG. 8C illustrates the scene from the viewpoint of the second remote video device 200b. Due to the angle of the second remote video device 200b relative to the real-world object 810, the second remote video device 200b produces a video feed of the environment that includes a portion of the real-world object 810. The partial image of the real-world object 810 may limit the environmental map 122 that the second remote video device 220b is able to produce at a given time. For example, the rear portion of the person represented as real-world object 810 is absent from the FOV for the second remote video device 200b, and a second environmental map 122b produced by the second remote video device 200b may include a mesh of the front of the person's torso and a general location in the environment for the person (e.g., based on the location of the second remote video device 220b and a distance and angle to the real-world object 810). However, the second environmental map 122b may lack information about the rest of the person such as the pose (e.g., limb positions for limbs outside of the FOV).

FIG. 8D illustrates the scene from the viewpoint of the third remote video device 200c. Due to the distance and angle of the third remote video device 200c relative to the real-world object 810, the third remote video device 200c produces a video feed of the environment that includes a portion of the real-world object 810. The partial image of the real-world object 810 may limit the environmental map 122 that the third remote video device 220c is able to produce at a given time. For example, the third remote video device 200c produces a third environmental map 122c from a birds-eye-view, and may include a mesh for the real-world object 810 that omits the facial expression or identity of that person, but demonstrates the positions of the limbs of the person.

FIG. 8E illustrates the view provided to the user of the AR device 110 reconciled with data from the remote video devices 200 to represent the real-world object 810 to the user as an AR object 820 at a location and position/orientation/ expression corresponding to the real-world object 810. Each of the remote video devices 200a-c produce a mesh of the real-world object 810 for inclusion in a respective environmental map 122a-c. Although each of the environmental maps 122a-c may not individually have a full picture of the real-world object 810, the AR application 121 provided on the AR device 110 may receive the several environmental maps 122a-c to reconcile the several individual meshes into a more complete knowledge of the real-world entity 810 for inclusion in the AR experience. For example, the AR application 121 may use the shared locations of the several meshes in the several environmental maps 122a-c to determine that each mesh refers to a different aspect or face of one real-world object 810.

Once the AR application 121 has identified several meshes as referring to one real-world object 810, meshes are combined into a reconciled mesh with data from each mesh used to supplement the data for the reconciled mesh. Based on the examples provided in FIGS. 8B-D, the AR application 121 may retrieve an identity of the person from the first environmental map 122a (e.g., from a jersey number identified in the first partial view), a facial expression of the person from the second environmental map 122b (e.g., from the face viewable in the second partial view), and limb positions from the third environmental map 122c. The AR application 121 uses the reconciled mesh to provide an AR object 820 that represents the real-world object 810 with information gathered from several remote video devices 200.

The receiving device uses the reconciled AR object 820 to expand the local knowledge of the real-world object 810 or construct an AR experience that includes the AR object 820. For example, the AR object 810 may be output for display on an AR device 100, as illustrated in FIG. 8E, that does not have a direct line of sight that includes all the real-world object 810 (e.g., as an "X-ray vision" effect). The AR application 121 may use the information from the remote video device 200 including the location, pose, identity, expression, etc., to provide an AR object 820 that supplements the view provided in the AR experience. In another example, the first remote video device 200a may receive the AR object 820 to expand the knowledge of the real-world object 810 beyond the upper torso of a person to thereby include limbs, poses, etc., which may be used for navigational purposes (e.g., to follow or to avoid flying into the person).

Figure 9:
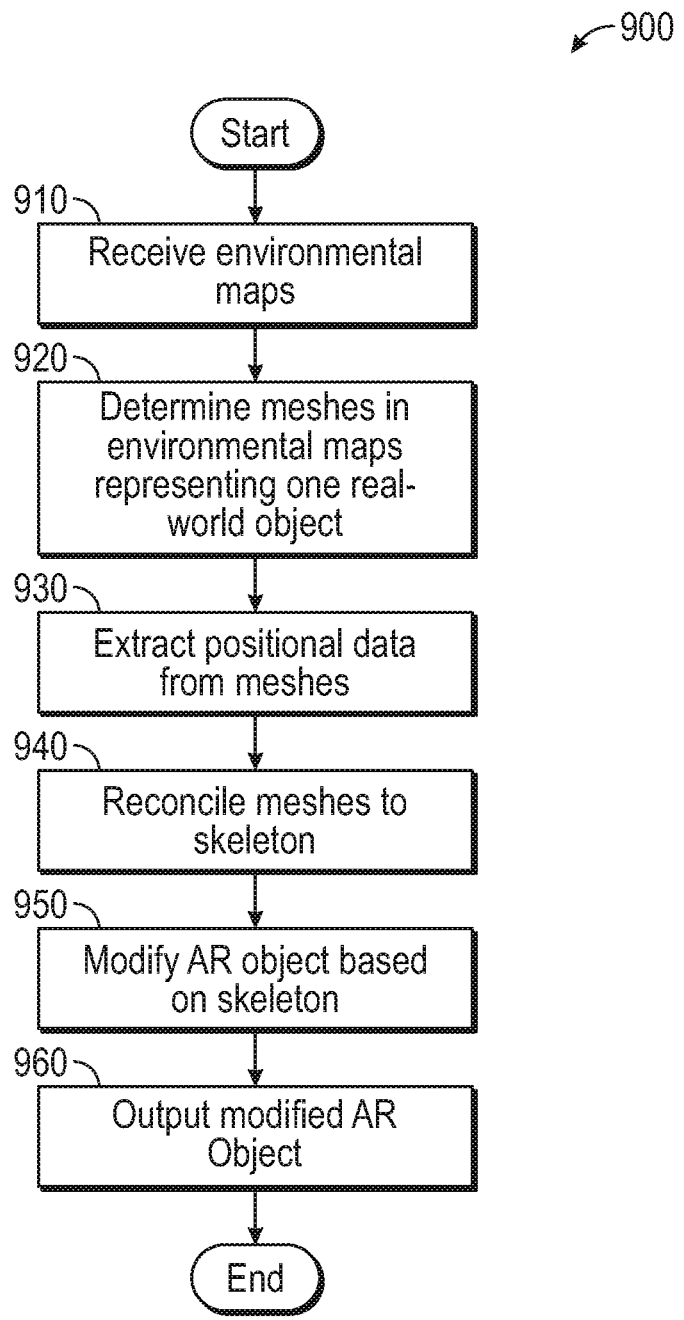
FIG. 9 is a flowchart of a method for resolving a partially-viewed real-world object from several remote video devices, according to aspects of the present disclosure.

FIG. 9 is a flowchart of a method 900 for resolving a partially-viewed real-world object from several remote video devices 200. Method 900 beings with block 910, where an AR application 121 receives a plurality of environmental maps 122 with various real-world objects represented therein as full or partial meshes of those real-world objects.

At block 920, the AR application 121 determines which meshes represent a shared real-world object. For example, a first mesh in a first environmental map 122a may represent a first real-world object from a first perspective, and a second mesh in a second environmental map 122b may represent that first real-world object from a second perspective. The AR application 121 may use the location of the real-world object in the environmental map, an object identifier, or the like to determine that two or more meshes represent at least a portion of the same real-world object.

At block 930, the AR application 121 extracts positional data from each of the meshes of a shared real-world object. The positional data describes the time at which the mesh was generated, the orientation at which the mesh was generated, and the image/positional/pose/expression information related to the real-world object described in the mesh. For example, a first mesh may identify the upper back torso of a person and include the relative size and the orientation of the person (e.g., facing away from the remote video device 200 used to generate the mesh) in the perspective data. In another example, a second mesh may identify the face of a person and include the orientation of the person and facial expression of the person (based on the identified face) in the perspective data. In a further example, a third mesh may identify a rea-view of the person that includes the positions of arms, legs, and head for the person (i.e., a pose) in the perspective data. The pose of the real-world object may include a position of the components of the real-world object at a given time (e.g., an arm raised), or a series of positions of one or more components over a window of time (e.g., a raised arm moving back and forth to wave).

It block 940, the AR application 121 reconciles the meshes to a shared skeleton using the positional data. The AR application 121 may overlay the several instances of positional data with one another via a shared skeleton for a reconciled AR object. A skeleton provides a framework onto which various data with positional characteristics may be aggregated to provide a single mesh of a real-world object. The skeleton may be adjusted in size, position, and pose within the environment with various data overlaid to the skeleton as those data become available, and with gaps in the data represented with placeholders values. For example, a first mesh of a person's body and a second mesh of that person's face may lack information related to the person's neck; leaving the facing of the person's head ambiguous from the two meshes. The AR application 121 may forego place each of meshes onto the skeleton at a relevant position, and leave the pose of the person's head (looking left, right, up, down, askew) set to a default state until positional data related to the neck or the orientation of the face is known.

In some embodiments, the meshes include sufficient data to overlay the two or more meshes into a single mesh. For example, a first mesh of an upper body of a person and a second mesh of a lower body of that person may be aligned based on overlapping portions of the person found in the first and second meshes. When overlapping portions of the positional data conflict, the AR application 121 may use confidence scores associated with the generated meshes to determine whether to use positional data from one mesh or another, or to average the data. In other embodiments, the positional data may not be fully alignable due to the meshes not including a shared area, which the AR application 121 may reconcile by applying the positional data to portions of the shared skeleton or as data fields if a mapping to the skeleton is not possible within a given confidence threshold. Although examples are given herein primarily in terms of skeletons for persons, the AR application 121 may reconcile meshes for animals, machines, buildings, and other real-world objects via appropriate skeletons as a basis.

At block 950, the AR application 121 modifies the AR object in the local environmental map 122 based on the skeleton and the positional data received from the other environmental maps 122. AR application 121 adjusts the size and orientation of the AR object in one environmental map 122 to match the known size and orientation of the AR objection in the local or reconciles environmental map 122 from the perspective of the AR device 100 or remote video device 200 running the AR application 121. For example, a first remote video device 200a that faces a back of a person may receive positional data from a second remote video device 200b that faces the front of that person in which the right hand of the person is raised. The AR application 121 on the first video device 200a may then extrapolate where the raised right hand of the person is located in the local environmental map 122 or may replace the mesh for the real-world object with a reconciled mesh that is sized and rotated in the environment based on the original mesh. When reconciling meshes of an object, the AR application 121 may map the meshes to skeletons for those objects to track various poses/positional data across different devices.

At block 960, the AR application 121 outputs the modified AR object. The AR application 121 may use the modified AR object for display as a virtual object in an AR experience, may use portions of the modified object for display as a virtual object in conjunction with a displayed real-world object, or use the additional information related to the object without displaying a virtual object related to that additional information. For example, a virtual object of a person's expression from one perspective may be shown as a virtual object of that expression in a second perspective that does not originally include the person's expression. In another example, an AR object of a person's body may be aligned with a displayed real-world image of that person's upper torso in which the person's lower body is obscured by an obstacle to provide a virtual object of the person's legs from behind the obstacle. In a further example, an AR application 121 may maintain an output of a partial view of the real-world object, but use data related to where unseen portions of the real-world object are located or positioned in the environment to affect an AR experience.

Method 900 may then conclude.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Furthermore, although some embodiments may achieve advantages over other possible solutions or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatus (systems) and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the flowchart illustrations or block diagram block or blocks.

The computer program instructions may also be loaded onto a computer, other programmable data processing apparatus, or other device to cause a series of operational steps to be performed on the computer, other programmable apparatus or other device to produce a computer implemented process such that the instructions which execute on the computer or other programmable apparatus provide processes for implementing the functions/acts specified in the flowchart illustrations or block diagram block or blocks.

The flowchart illustrations and block diagrams in the Figures illustrate the architecture, functionality, and operation of possible implementations of systems, methods and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of reconciling a first environmental map of an environment created by a first device with a second environmental map of the environment created by a second device, the method comprising:
   identifying one real-world object represented with first positional data in the first environmental map and with second positional data in the second environmental map;
   determining a first confidence score for a first location of the one real-world object in the first environmental map, and a second confidence score for a second location of the one real-world object in the second environmental map;
   reconciling the first environmental map with the second environmental map into a reconciled environmental map based on the first positional data and the second positional data;
   anchoring a reconciled AR object associated with the one real-world object in the reconciled environmental map based on the first positional data and the first confidence score relative to the second positional data and the second confidence score; and
   outputting the reconciled environmental map to an AR device, wherein the reconciled AR object is located closer to the first location than the second location in the reconciled environmental map when the first confidence score is higher than the second confidence score.

2. The method of claim 1, further comprising:
   wherein the first positional data is provided from a first point of view and includes a first partial mesh of the one real-world object and the second positional data is provided from a second point of view and includes a second partial mesh of the one real-world object; and
   wherein reconciling the first environmental map with the second environmental map includes applying the first positional data and the second positional data to a shared skeleton for the reconciled AR object.

3. The method of claim 2, wherein the first positional data and the second positional data each include:
   a location of the one real-world object in the environment;
   an orientation of the one real-world object in the environment; and
   positions of various components of the one real-world object in the environment.

4. The method of claim 1, wherein the first environmental map is created at a first time and the second environmental map is created at a second time, and wherein a difference in the first confidence score and the second confidence score is based at least in part on a difference between the first time and the second time.

5. The method of claim 1, wherein a difference in the first confidence score and the second confidence score is based at least in part on a difference between a first distance between the first device and the one real-world object when the first environmental map is created and a second distance between the second device and the one real-world object when the second environmental map is created.

6. The method of claim 1, wherein the first environmental map includes an area not included in the second environmental map, wherein the reconciled environmental map includes the area.

7. A method, comprising:
   constructing, by a first video device, a first map of an environment based on a first field of view of the first video device;
   retrieving a second map of the environment produced by a second video device based on a second field of view of the second video device, different from the first field of view;
   identifying, by the first video device, a third field of view in the environment for a third device of an AR (Augmented Reality) device, wherein the third field of view is different from both the first field of view and the second field of view;
   reconciling the first map with the second map to produce a reconciled map, wherein objects identified at a shared position in the environment in both the first map and the second map are included in the reconciled map at the shared position, and objects identified at different positions in the first map and the second map are included in the reconciled map at a given position specified in one of the first map and the second map based on which of the first map and the second map is associated with a higher confidence score for the given position;
   anchoring an AR object at a given position in the reconciled map; and
   in response to the third field of view including the given position, outputting the AR object in a video feed produced by the AR device.

8. The method of claim 7, wherein reconciling the first map with the second map to produce a reconciled map further comprises:
   identifying a first object in the first map and a second object in the second map that respectively represent a first partial mesh and a second partial mesh of one real-world object;
   applying first positional data from the first partial mesh and second positional data from the second partial mesh to a shared skeleton for the one real-world object; and
   applying the shared skeleton to the AR object anchored in the reconciled map to represent the one real-world object.

9. The method of claim 7, wherein the AR object is inserted into the video feed to highlight a given object absent from the second map and present in the first map.

10. The method of claim 7, wherein the AR object is overlaid into the video feed in a line-of-sight to the AR device over an obstructing object in the environment.

11. The method of claim 7, wherein the second video device is a virtual video device and the second map is a virtual map of the environment.

12. The method of claim 7, wherein a confidence score for a first position of a given object is based on factors selected from a group comprising:
   a speed of travel of the first video device when determining a relative distance to a particular object in the environment.

13. The method of claim 12, wherein the confidence score for the first position of the given object is based on:
   whether a weather condition was present when determining the relative distance to the particular object.

14. The method of claim 7, wherein the confidence score for the first position of the given object is based on:
   whether a given location was determined by measurement or estimation by the first video device.

15. The method of claim 7, wherein the AR object is output at a given scale based on a distance between the third device and the given position.

16. A method of reconciling a first environmental map of an environment created by a first video device with a second environmental map of the environment created by a second video device, the method comprising:
   receiving a video feed of the environment from the first video device having a real-world object in a field of view of the first video device, the video feed providing first positional data on the real-world object, wherein the first positional data are associated with a first confidence score and a first location;
   determining second positional data for the real-world object from the second environmental map, wherein the second positional data are associated with a second confidence score and a second location, different than the first location;
   anchoring an Augmented Reality (AR) object that represents the real-world object into a reconciled environmental map at the second position when the first confidence score is lower than the second confidence score; and
   outputting the video feed for display with the AR object overlaid onto the video feed when the position is in the field of view of the first video device.

17. The method of claim 16, wherein the AR object is overlaid onto the video feed to indicate that the real-world object is absent from the field of view and present in the second environmental map.

18. The method of claim 16, wherein the first positional data and the second positional data each include:
   a location for the real-world object in the environment;
   an orientation for the real-world object in the environment; and
   a pose of the real-world object.

19. The method of claim 16, wherein the first positional data provide a first partial mesh of the real-world object and the second positional data provide a second partial mesh of the real-world object that are reconciled into the AR object via a shared skeleton.

20. The method of claim 16, wherein the first positional data are associated with a first confidence score and the second positional data are associated with a second confidence score, wherein the position is set based on an average of the first positional data weighted by the first confidence score and the second positional data weighted by the second confidence score.

* * * * *